(12) United States Patent
Sugaya

(10) Patent No.: US 11,012,180 B2
(45) Date of Patent: May 18, 2021

(54) COMMUNICATION DEVICE AND COMMUNICATION CONTROL METHOD

(71) Applicant: Sony Corporation, Tokyo (JP)

(72) Inventor: Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/349,996

(22) PCT Filed: Oct. 5, 2017

(86) PCT No.: PCT/JP2017/036330
§ 371 (c)(1),
(2) Date: May 15, 2019

(87) PCT Pub. No.: WO2018/116578
PCT Pub. Date: Jun. 28, 2018

(65) Prior Publication Data
US 2019/0273575 A1 Sep. 5, 2019

(30) Foreign Application Priority Data

Dec. 20, 2016 (JP) .............................. JP2016-246538

(51) Int. Cl.
*H04L 1/00* (2006.01)
*H04L 1/16* (2006.01)
(Continued)

(52) U.S. Cl.
CPC .......... *H04L 1/0008* (2013.01); *H04L 1/1607* (2013.01); *H04L 41/022* (2013.01);
(Continued)

(58) Field of Classification Search
CPC ... H04L 1/0008; H04L 1/1607; H04L 41/022; H04W 28/06; H04W 72/0446; H04W 74/002; H04W 84/12
(Continued)

(56) References Cited

U.S. PATENT DOCUMENTS 6,865,609 B1 * 3/2005 Gubbi ..................... H04L 29/06
370/349
9,854,607 B1 * 12/2017 Chu ..................... H04W 52/241
(Continued)

FOREIGN PATENT DOCUMENTS

JP 2004-525586 A 8/2004
JP 2015-23545 A 2/2015
(Continued)

OTHER PUBLICATIONS

International Search Report and Written Opinion dated Dec. 26, 2017 for PCT/JP2017/036330 filed on Oct. 5, 2017, 8 pages including Translation of the International Search Report.
(Continued)

*Primary Examiner* — Brenda H Pham
(74) *Attorney, Agent, or Firm* — Xsensus LLP

(57) ABSTRACT

[Object] To enable a communication device which has received a response frame to identify a BSS to which a transmitting device of the response frame belongs while ensuring backward compatibility.

[Solution] Provided is a communication device that transmits a response frame, including: a generating unit configured to generate the response frame in which information used for identification of a BSS to which the communication device belongs or information used for identification of an own device is included in or after a padding bit specified in IEEE 802.11; and a transmitting unit configured to transmit the response frame.

13 Claims, 20 Drawing Sheets

(51) Int. Cl.
  *H04L 12/24* (2006.01)
  *H04W 28/06* (2009.01)
  *H04W 72/04* (2009.01)
  *H04W 74/00* (2009.01)
  *H04W 84/12* (2009.01)

(52) U.S. Cl.
  CPC ....... *H04W 28/06* (2013.01); *H04W 72/0446* (2013.01); *H04W 74/002* (2013.01); *H04W 84/12* (2013.01)

(58) Field of Classification Search
  USPC .......................................... 370/349, 389, 392
  See application file for complete search history.

(56) References Cited

U.S. PATENT DOCUMENTS

| | | | |
|---|---|---|---|
| 2015/0230244 A1 | 8/2015 | Choi et al. | |
| 2015/0312386 A1* | 10/2015 | Lee ......................... | H04L 69/22 370/338 |
| 2016/0142980 A1* | 5/2016 | Lee ......................... | H04W 52/38 370/336 |
| 2016/0149676 A1* | 5/2016 | Jauh ..................... | H04W 52/242 370/329 |
| 2016/0330663 A1 | 11/2016 | Zhou et al. | |
| 2017/0289987 A1 | 10/2017 | Seok | |
| 2017/0295560 A1 | 10/2017 | Kim et al. | |

FOREIGN PATENT DOCUMENTS

| | | |
|---|---|---|
| JP | 2015-122758 A | 7/2015 |
| WO | 2016/087917 A1 | 11/2016 |
| WO | 2016/186469 A1 | 11/2016 |

OTHER PUBLICATIONS

Extended Search Report issued in European Application 17885096.2-1215 dated Nov. 12, 2019.

* cited by examiner

COMMUNICATION DEVICE AND COMMUNICATION CONTROL METHOD

CROSS-REFERENCE TO RELATED APPLICATIONS

The present application is based on PCT filing PCT/JP2017/036330, filed Oct. 5, 2017 which claims priority to JP 2016-246538, filed Dec. 20, 2016, the entire contents of each are incorporated herein by reference.

TECHNICAL FIELD

The present disclosure relates to a communication device and a communication control method.

BACKGROUND ART

In recent years, standardization of new wireless LANs has been reviewed by a working group of IEEE 802.11 or the like, and among them, various reviews related to setting of a transmission prohibition period (hereinafter referred to as a "network allocation vector (NAV)" for the sake of convenience) have been conducted.

For example, for a setting of an NAV based on a response frame (CTS, ACK, or the like), a communication device which has received a response frame addressed to another device determining a basic service set (hereinafter referred to as a "basic service set (BSS)" for the sake of convenience) from which a signal corresponding to the response frame is transmitted and setting the NAV in accordance with a determination result is under review. Further, newly adding information used for this determination to the response frame is also under review. A method of adding an association identifier (AID) to a frame is disclosed in Patent Literature 1.

CITATION LIST

Patent Literature

Patent Literature 1: JP 2015-122758A

DISCLOSURE OF INVENTION

Technical Problem

Here, a frame format of an existing response frame does not include a transmitter address field (hereinafter referred to as a "TA field" for the sake of convenience) in which address information of a transmitting device is set. For this reason, for example, in a case in which a station device (hereinafter referred to as an "STA" for the sake of convenience) receives a response frame which is transmitted from an access point device (hereinafter referred to as an "AP" for the sake of convenience) to another STA, the STA is unable to compare the address information of the AP which is known in advance and the address information of the TA field and determine whether or not the response frame is a signal transmitted from an own BSS.

Further, when new methods of determining a BSS which is a transmission source of the response frame are reviewed, it is more desirable to consider backward compatibility as well, in other words, if a communication device supporting an existing subordinate standard is unable to appropriately receive the response frame transmitted by a communication device supporting such a new method, in a case in which the devices of both standards belong to the same BSS, problems in which the NAV or the like is unable to be appropriately set may occur.

In this regard, the present disclosure was made in light of the foregoing, and the present disclosure provides a communication device and communication control method which are novel and improved and capable of identifying a BSS to which a transmitting device of a response frame belongs while ensuring backward compatibility.

Solution to Problem

According to the present disclosure, there is provided a communication device that transmits a response frame, including: a generating unit configured to generate the response frame in which information used for identification of a BSS to which the communication device belongs or information used for identification of an own device is included in or after a padding bit specified in IEEE 802.11; and a transmitting unit configured to transmit the response frame.

Moreover, according to the present disclosure, there is provided a communication control method of transmitting a response frame executed by a computer, including: generating the response frame in which information used for identification of a BSS to which an own device belongs or information used for identification of the own device is included in or after a padding bit specified in IEEE 802.11; and transmitting the response frame.

Moreover, according to the present disclosure, there is provided a communication device that receives a response frame, including: a receiving unit configured to receive the response frame in which information used for identification of a BSS to which a transmitting device of the response frame belongs or information used for identification of the transmitting device is included in or after a padding bit specified in IEEE 802.11; and an identifying unit configured to identify the BSS on the basis of the information used for the identification of the BSS.

Moreover, according to the present disclosure, there is provided a communication control method of receiving a response frame executed by a computer, including: receiving the response frame in which information used for identification of a BSS to which a transmitting device of the response frame belongs or information used for identification of the transmitting device is included in or after a padding bit specified in IEEE 802.11; and identifying the BSS on the basis of the information used for the identification of the BSS.

Advantageous Effects of Invention

As described above, according to the present disclosure, it is possible for a communication device which has received a response frame to identify a BSS to which a transmitting device of the response frame belongs while ensuring backward compatibility.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
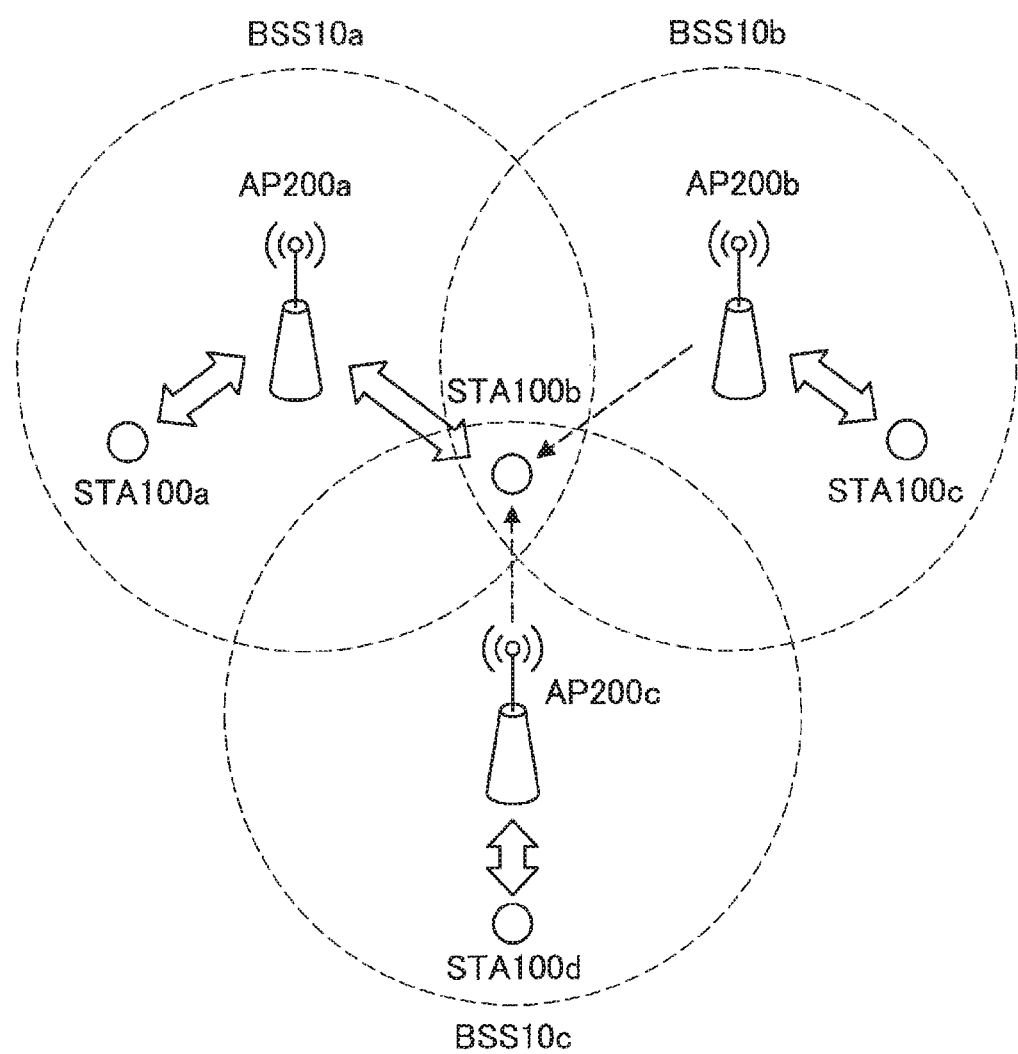
FIG. 1 illustrates a configuration of a wireless LAN system according to an embodiment of the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. Overview of wireless LAN system
2. Functional configuration of device
3. Operation of device
4. Modifications
5. Application examples
6. Others
7. Conclusion 1. Overview of Wireless LAN System An embodiment of the present disclosure relates to a wireless LAN system. First, an overview of a wireless LAN system according to an embodiment of the present disclosure is described.

1-1. Configuration of Wireless LAN System

First, a configuration of a wireless LAN system according to an embodiment of the present disclosure will be described with reference to FIG. 1. FIG. 1 is a diagram illustrating a configuration of a wireless LAN system according to an embodiment of the present disclosure. The wireless LAN system according to an embodiment of the present disclosure includes an AP 200 and an STA 100 as illustrated in FIG. 1. A BSS 10 is constituted by one AP 200 and one or more STAs 100.

A type and a scheme of a wireless LAN system according to an embodiment of the present disclosure are arbitrary. For example, a modulation scheme, a code rate, or the like of the wireless LAN system according to the present embodiment can be arbitrarily set. Further, the wireless LAN system according to the present embodiment can be installed in an arbitrary place. For example, the wireless LAN system according to the present embodiment may be installed in office buildings, housing, commercial facilities, public facilities, or the like.

In addition, an area of the BSS 10 according to the present embodiment may overlap with an area of another BSS 10 using an overlapping frequency channel (hereinafter, referred to as "overlap basic service set (OBSS)" for convenience); in that case, a signal transmitted from the STA 100 located in the overlap area may interfere with a signal transmitted from the OBSS.

Referring to the example of FIG. 1, areas of a BSS 10a, a BSS 10b, and a BSS 10c partially overlap each other, and an STA 100b belonging to the BSS 10a is located in the overlapping region, in this case, the BSS 10b and the BSS 10c are OBSSs for the BSS 10a, the BSS 10a and the BSS 10c are OBSSs for the BSS 10b, and the BSS 10a and the BSS 10b are OBSSs for the BSS 10c. Further, there are cases in which a signal transmitted from the STA 100b located in the overlapping region of the BSS 10a, the BSS 10b, and the BSS 10c interferes with signals transmitted from the BSS 10b and BSS 10c which are the OBSSs of the BSS 10a.

The AP 200 according to the present embodiment is a communication device to be connected to an external network, and to provide communication with the external network for the STA 100. For example, the AP 200 is connected to the Internet, and provides communication between the STA 100 and a device on the Internet or a device connected via the Internet.

The STA 100 according to the present embodiment is a communication device that communicates with the AP 200. The STA 100 may be any communication device. For example, the STA 100 may be a display with a display function, a memory with a storage function, a keyboard and a mouse with an input function, a speaker with a sound output function, or a smartphone with a function of executing advanced calculation processing.

In a case in which each communication device of the AP 200 and the STA 100 receives an RTS addressed to another device or a CTS addressed to another device, each communication device of the AP 200 and the STA 100 sets "own BSS NAV (a first transmission suppression period)" in a case in which these signals are identified as signals transmitted from the own BSS, and sets an "OBSS NAV (a second transmission suppression period)" in a case in which these signals are identified as signals transmitted from the OBSS. Each communication device prevents the occurrence of interference by not performing frame transmission during the period in which the NAV is set.

1-2. Background

The overview of the wireless LAN system according to the present embodiment has been described above. Next, the background of the present disclosure will be described with reference to FIGS. 2 to 4.

Figure 2:
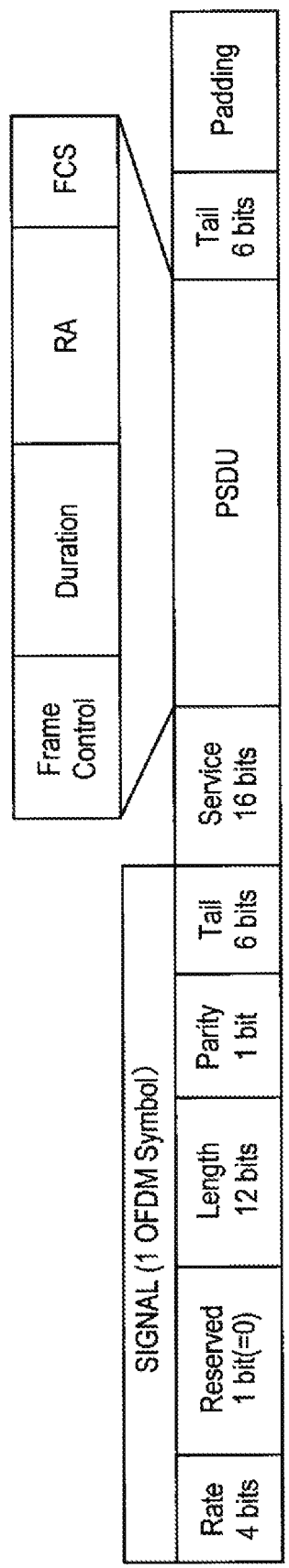
FIG. 2 is a diagram illustrating a frame configuration of a response frame specified in IEEE 802.11.

First, a frame configuration of a response frame specified in IEEE 802.11 will be described with reference to FIG. 2. FIG. 2 is a diagram illustrating a frame configuration of a response frame specified in IEEE 802.11. Further, the following description will proceed under the assumption that the response frame is a CTS or an ACK, but the present disclosure is not limited thereto.

As illustrated in FIG. 2, a response frame specified in IEEE 802.11 includes a SIGNAL field, a Service field, a PLCP Service Data Unit (PSDU) field, a Tail bit and a Padding bit. Further, the SIGNAL field includes a Rate field, a Reserved field, a Length field, a Parity bit, and a Tail bit, and the PSDU field includes a Frame Control field, a Duration field, a Receiver Address field (indicated by "RA" in FIG. 2), and a Frame Check Sequence (FCS) field.

Here, as described above, the TA field is not included in the frame format of the response frame. Therefore, for example, in a case in which a certain STA receives a response frame which is transmitted from an AP of the own BSS to another STA, the STA is unable to compare the address information of the AP which is already known and the address information of the TA field and determine whether or not the response frame is a signal transmitted from the own BSS. In other words, the STA is unable to determine whether or not the response frame is a signal transmitted from the own BSS unless the STA already knows the address information of another STA belonging to the own BSS by a certain method.

Further, in a case in which a certain STA receives a response frame transmitted from an OBSS, the STA is unable to determine the OBSS from which the response frame is transmitted unless the STA already knows the address information of each of the AP and the STA belonging to the OBSS.

Next, the influence of the STA being unable to determine the BSS from which the response frame is transmitted will be described with reference to FIG. 3.

Figure 3:
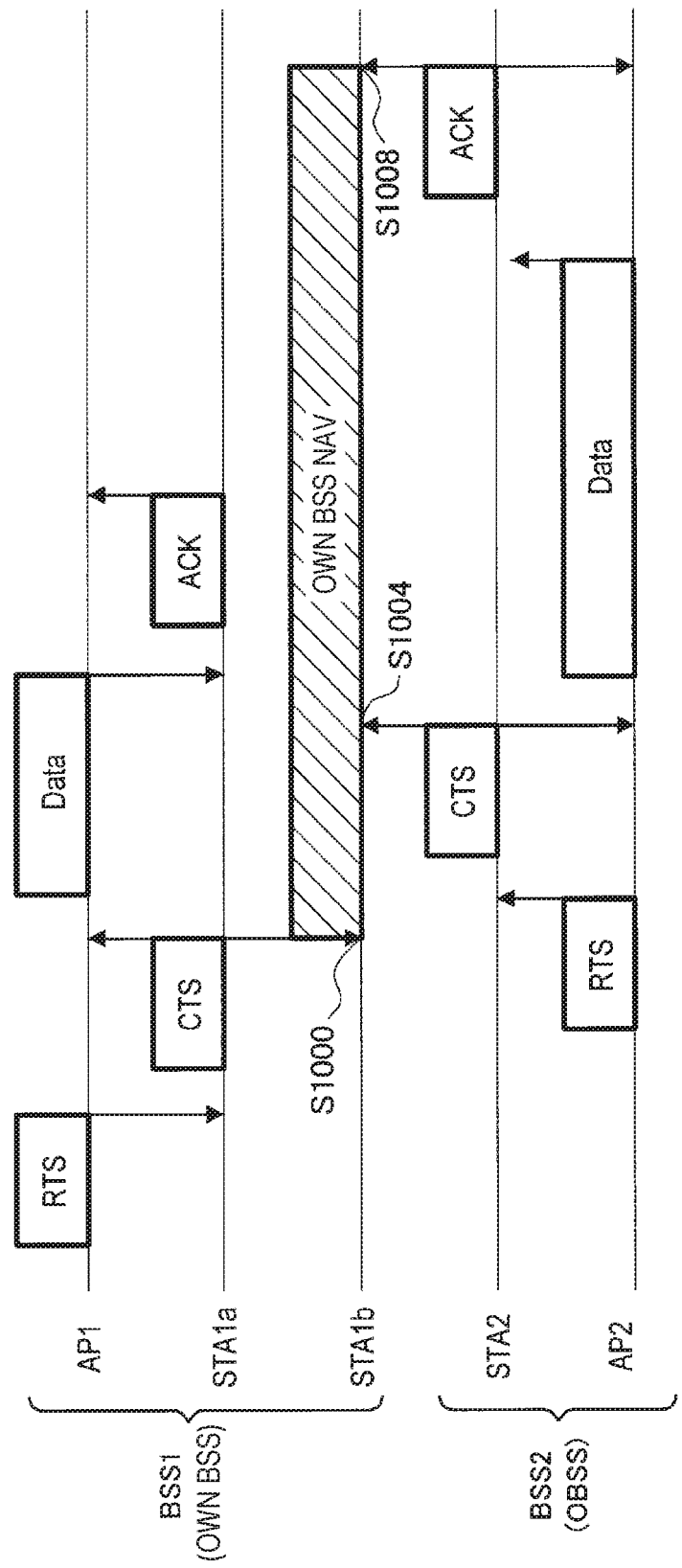
FIG. 3 is a diagram for describing the background of the present disclosure.

A case in which regions of a BSS 1 and a BSS 2 partially overlap each other and an STA 1b belonging to the BSS 1 is located in the overlapping region as illustrated in FIG. 3 is considered. In other words, the STA 1b may receive not only a signal transmitted from the BSS 1 which is the own BSS, but also a signal transmitted from the BSS 2 which is the OBSS.

First, in step S1000 of FIG. 3, the STA 1b is assumed to receive a CTS addressed to the AP 1 from the STA 1a belonging to the own BSS. The STA 1b can determine that the CTS is a signal transmitted from the own BSS by comparing the address information of the AP which is already known and the address information of the AP set in the RA field of the CTS. Therefore, the STA 1b sets the own BSS NAV on the basis of a Duration included in the CTS.

Then, in a case in which the STA 1b receives a CTS addressed to the AP 2 from the STA 2 belonging to the OBSS in step S1004, the STA 1b is unable to identify the BSS from which the CTS is transmitted as described above. Therefore, the STA 1b is unable to perform access control different from that in a case in which the CTS is transmitted from the own BSS. For example, the STA 1b is unable to perform, for example, access control of enabling transmission of a signal with a predetermined condition in a case in which it is determined on the basis of a received field strength or the like of the CTS that the influence of the interference is not large. In the example of FIG. 3, the STA 1b sets and updates the own BSS NAV as a process in a case in which the BSS from which the CTS is transmitted is unable to be identified. Then, the STA 1b is unable to transmit a signal until the own BSS NAV is released by receiving an ACK in step S1008.

Further, in the existing technology, a communication device is unable to set the OBSS NAV for each OBSS. In other words, even in a case in which there is a plurality of OBSSs, the communication device sets a single OBSS NAV Therefore, even in a case in which the CTS is received from a plurality of OBSSs under the assumption that the communication device is able to identify the BSS which is the transmission source of the CTS by a certain method, the OBSS NAV is unable to be set for each OBSS. Next, the influence of the OBSS NAV not being set for each OBSS will be described with reference to FIG. 4.

Figure 4:
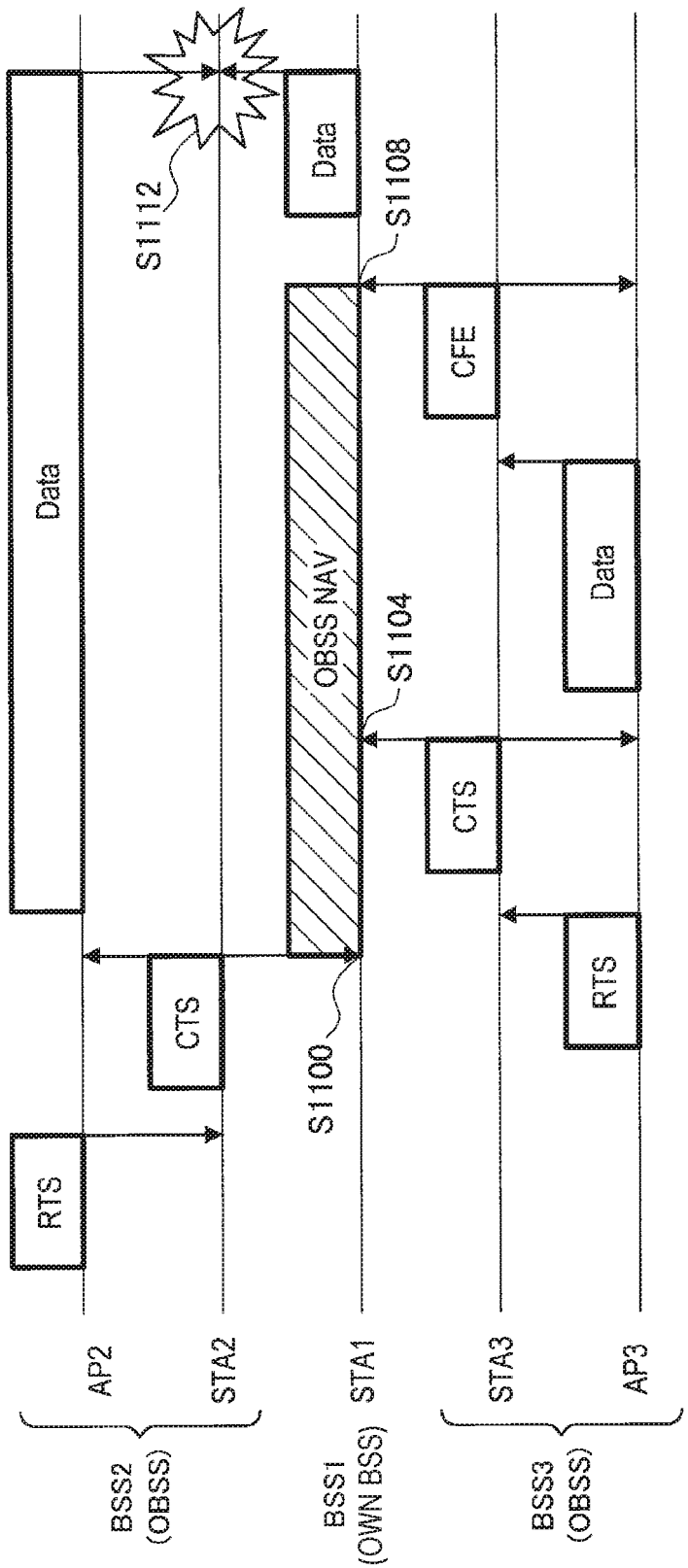
FIG. 4 is a diagram for describing the background of the present disclosure.

A case in which regions of a BSS 1, a BSS 2, and a BSS 3 partially overlap each other, and an STA 1 belongs to the BSS 1 is located in the overlapping region as illustrated in FIG. 4 is considered. In other words, there are cases in which the STA 1 receives not only a signal transmitted from the BSS 1 which is the own BSS, but also signals transmitted from the BSS 2 and the BSS 3 which are OBSSs.

First, in step S1100 of FIG. 4, the STA 1 receives a CTS addressed to an AP 2 from an STA 2 belonging to the BSS 2 which is the OBSS. Here, the STA 1 is assumed to be able to determine, by a certain method, that the CTS is a signal transmitted from the OBSS and set the OBSS NAV. Then, in step S1104, the STA 1 receives a CTS addressed to the AP 3 from an STA 3 belonging to the BSS 3 which is the OBSS. Even if the STA can determine that the CTS is a signal transmitted from the OBSS by a method similar to that described above but is unable to set the OBSS NAV for each OBSS as described above, the STA 1 updates the OBSS NAV without newly setting a separate OBSS NAV.

Accordingly, when the STA 1 receives a Contention Free-END (CF-END) (indicated by "CFE" in FIG. 4) from the STA3 in step S1108, the STA 1 releases the OBSS NAV, even though data transmission and reception are not completed in the BSS 2 which is the OBSS. Accordingly, in step S1112, interference occurs due to the signal transmitted by the STA 1 and the signal transmitted from BSS 2. The occurrence of such interference lowers the utilization efficiency of the transmission path.

In this regard, the inventor of the present disclosure was finally able to create the present disclosure focusing on the above circumstances. Information used for identification of the BSS is set in the response frame related to the present disclosure. Accordingly, the communication device which has received the response frame can determine the BSS from which the response frame is transmitted on the basis of the information and appropriately select the own BSS NAV or the OBSS NAV depending on a determination result. Further, the communication device according to the present embodiment can set a different OBSS NAV for each OBSS. Accordingly, the communication device according to the present embodiment can appropriately set and release the OBSS NAV. Further, the present disclosure can ensure the backward compatibility. In other words, the communication device according to the present embodiment can also appropriately communicate with existing communication devices (hereinafter referred to as "legacy devices" for the sake of convenience) to which the present disclosure is not applied. Further, although the CTS is mainly described as the response frame in this specification, the present disclosure is not limited to this example, and the present disclosure may be applied to other response frames such as the ACK. An example in which the present disclosure is applied to the ACK will be described in detail in "6. Others."

1-3. Overview of Functions of Wireless LAN System

The background of the present disclosure has been described above. Next, an overview of the functions of the wireless LAN system according to the present embodiment will be described.

The communication device in the wireless LAN system according to the present embodiment adds a footer (Footer) having information used for identification of the BSS to which the transmitting device of the CTS belongs to the CTS. More specifically, the communication device according to the present embodiment generates a footer having a "BSS color" as the information used for the identification of the BSS to which the transmitting device of the CTS belongs, and adds the footer after the padding bit of the CTS specified in IEEE 802.11.

Here, the BSS color is a bit string used for uniquely identifying the BSS, and the communication device can determine the BSS from which a signal corresponding to the CTS is transmitted on the basis of the BSS color included in the footer added to the CTS. More specifically, the communication device stores the BSS color of the own BSS in advance, and can determine whether or not the received CTS is a signal transmitted from the own BSS by comparing the BSS color of the own BSS stored in the own device with the BSS color included in the received CTS. Further, since the communication device according to the present embodiment stores the BSS color of each OBSS in advance, the communication device according to the present embodiment can determine the OBSS from which the received CTS is transmitted by comparing the BSS color of each BSS stored in the own device with the BSS color included in the received. CTS.

Accordingly, the communication device according to the present embodiment sets the own BSS NAV in a case in which it is determined that the CTS is a signal transmitted from the own BSS, and sets the OBSS NAV for each OBSS in a case in which it is determined that the CTS is a signal transmitted from the OBSS. Since the communication device according to the present embodiment sets the OBSS NAV for each OBSS, it is possible to prevent the occurrence of an event in which the OBSS NAV is released on the basis of the CF-END from another OBSS even though communication of a certain OBSS is not completed as illustrated in the example illustrated in FIG. 4.

Further, the communication device according to the present embodiment also sets information related to an AID of the own device (that is, the transmitting device of the CTS) in the footer in addition to the BSS color when constructing the CTS. Accordingly, the communication device which has received the CTS can identify the transmitting device of the CTS. Further, the communication device which has received the CTS can detect the BSS to which the transmitting device of the CTS belongs on the basis of the BSS color.

Here, for example, a case in which the communication device receives the CF-END which is a signal used for releasing the NAV is considered. Even in a case in which the CF-END does not include the BSS color, the communication device can determine the BSS to which the communication device transmitting the CF-END belongs on the basis of the address information of the transmitting device included in the CF-END and the BSS color and the information related to the AID of the CTS which are received before the CF-END. Accordingly, even in a case in which a plurality of OBSS NAVs is set, the communication device can appropriately determine the OBSS NAV which has to be released.

Figure 5:
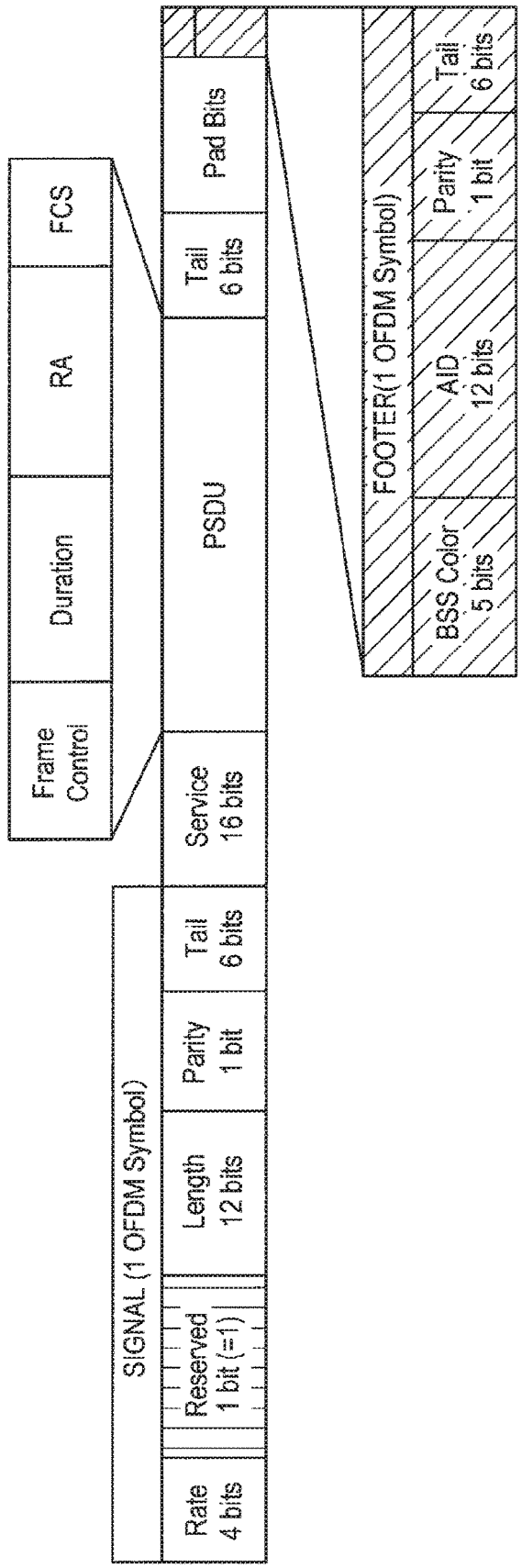
FIG. 5 is a diagram illustrating an example of a frame configuration of a CTS according to the present embodiment.

Here, a frame configuration of the CTS according to the present embodiment will be described with reference to FIG. 5. FIG. 5 is a diagram illustrating an example of a frame configuration of the CTS according to the present embodiment.

As illustrated in FIG. 5, a footer including a BSS color (indicated by "BSS Color" in FIG. 5), information related to an AID (indicated by "AID" in FIG. 5), a Parity bit, and a Tail bit is added to the CTS according to the present embodiment. Further, FIG. 5 illustrates an example in a case in which OFDM in which a modulation scheme of a sub carrier is BPSK, and a code rate is ½ is used, and the footer includes the number of bits (24 bits) corresponding to one OFDM symbol.

Then, arbitrary information (hereinafter referred to as "footer notification information" for the sake of convenience) indicating that the footer is added is set in the Reserved field (a bit "1" is set in FIG. 5), The communication device which has received the CTS can recognize that the footer is added since the footer notification information is set in the Reserved field, and can appropriately perform the reception processing for the footer.

Further, since the BSS color is included in the footer, the legacy device can perform the reception processing without error even in a case in which the CTS according to the present embodiment is received. More specifically, in a case in which the legacy device receives the CTS according to the present embodiment, since the legacy device does not recognize that the footer is added, the legacy device can perform the normal reception processing to the padding bit specified by the frame length information in the Length field without performing the reception processing for the footer. As described above, in the present embodiment, since the BSS color is set after the field through which the legacy device performs the reception processing on the basis of the frame length information, the backward compatibility can be ensured.

Further, since the Parity bit is included in the footer, the communication device can appropriately perform error detection for the footer portion at the time of decoding. Further, the frame configuration illustrated in FIG. 5 is merely an example, and an arrangement order, the number of bits, the modulation scheme, the code rate, or the like of each piece of information included in the footer can be appropriately changed.

Figure 6:
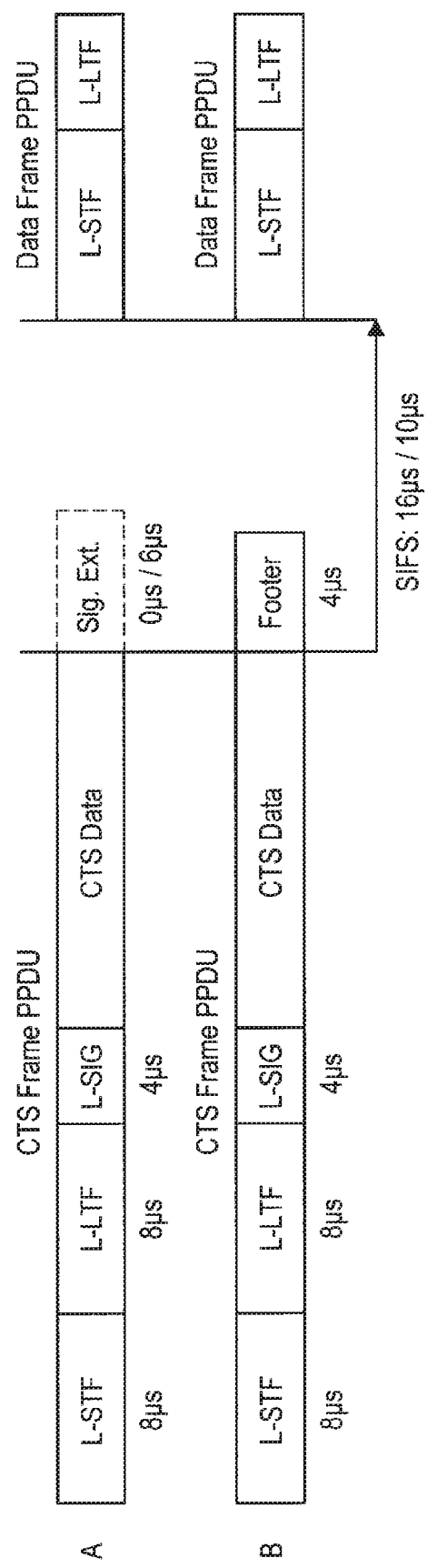
FIG. 6 is a diagram illustrating a chronological relation between a CTS to which a footer is added and a data frame in the present embodiment.

Next, a chronological relation between the CTS and the data frame according to the present embodiment will be described with reference to FIG. 6. FIG. 6 is a diagram illustrating a chronological relation between the CTS to which the footer is added and the data frame in the present embodiment. FIG. 6A illustrates a chronological relation between the CTS of the related art to which no footer is added and the data frame, and FIG. 6B illustrates a chronological relation between the CTS according to the present embodiment to which the footer is added and the data frame.

In the CTSs of both of FIGS. 6A and 6B, first, a short training symbol (indicated by "L-STF" in FIGS. 6A and 6B) and a long training symbol (indicated by "L-LTF" in FIGS. 6A and 6B) are set as a PLCP preamble. Thereafter, SIGNAL (indicated by "L-SIG" in FIGS. 6A and 6B) and data including a PSDU or the like (hereinafter referred to as "CTS Data" for the sake of convenience) are set. As illustrated in FIG. 6, the data length to the CTS data in the CTS of FIG. 6A is equal to that in the CTS of FIG. 6B.

Here, in FIG. 6A (that is, the CTS of the related art to which no footer is added), information (indicated by "Sig Ext" in FIG. 6A) which is appropriately expanded if necessary is added, and the data frame is transmitted after the transmission of the CTS Data ends and a short inter frame space (SIFS) elapses. On the other hand, in FIG. 6B (that is, the CTS according to the present embodiment), the footer including the BSS color or the like is added after the CTS Data. Here, similarly to FIG. 6A, a timing at which the data frame is transmitted is after the transmission of the CTS Data ends and the SITS elapses. Here, since the footer is adjusted to a bit length that can be communicated within the SIFS, the data frame can be communicated without influence later (FIG. 6B illustrates an example in which a footer corresponding to one OFDM symbol (4 μs) in which the modulation scheme of the sub carrier is BPSK, and the code rate is ½ is added). In other words, the backward compatibility can be ensured by adjusting the footer to the bit length that can be communicated within the SIFS.

Figure 7:
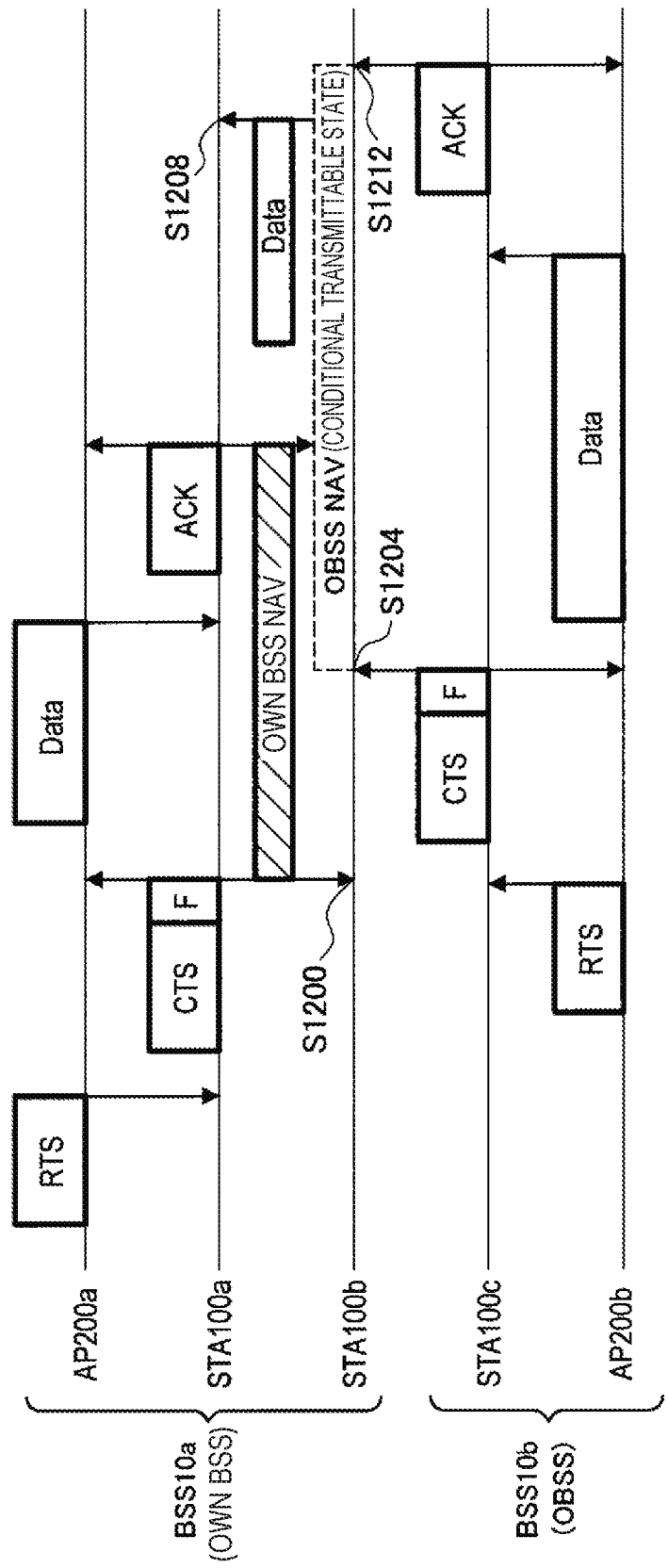
FIG. 7 is a diagram illustrating a setting of a NAV according to the present embodiment.

Next, the setting of the NAV according to the present embodiment will be described with reference to FIG. 7. In FIG. 7 corresponding to FIG. 3 described above, a BSS 10a and a BSS 10b partially overlap each other, and an STA 100b belonging to the BSS 10a is located in the overlapping region. Further, there are cases in which the STA 100b receives not only a signal transmitted from the BSS 10a which is the own BSS but also a signal transmitted from the BSS 10b which is the OBSS.

First, in step S1200 of FIG. 7, the STA 100b receives a CTS addressed to an AP 200a from an STA 100a belonging to the own BSS. Here, since the footer including the BSS color is added to the CTS, the STA 100b can recognize that the CTS is a signal transmitted from the own BSS on the basis of the BSS color (the STA 100b may recognize that the CTS is a signal transmitted from the own BSS on the basis of the address information of the AP 200a which is set in the RA field of the CTS, similarly to the example of FIG. 3). Then, the STA 100b sets the own BSS NAV on the basis of the Duration included in the CTS. Then, in step S1204, the STA 100b which has received the CTS addressed to the AP 200b from the STA 100c belonging to the OBSS can recognize that the CTS is a signal transmitted from the OBSS on the basis of the BSS color included in the footer of the CTS.

Then, in a case in which it is recognized that the received CTS is a signal transmitted from the OBSS, the STA 100b performs access control in accordance with the received field strength of the CTS. More specifically, in a case in which the received field strength of the CTS is lower than a predetermined threshold value, the STA 100b sets the OBSS NAV, and then, m a case in which a predetermined condition is satisfied during the OBSS NAV, the STA 100b sets a state in which signal transmission is possible (hereinafter referred to as a "conditional transmittable state" for the sake of convenience). Here, the "predetermined condition" may be an arbitrary condition. For example, the "predetermined condition" may be a condition that the communication device which has received the CTS calculates an upper limit value of transmission power that can prevent a communication failure due to interference on the basis of the received field strength of the CTS, and signal transmission becomes possible if the transmission power becomes equal to or less than the upper limit value. On the other hand, in a case in which the received field strength of the CTS is equal to or larger than the predetermined threshold value, the STA 100b sets the OBSS NAV without setting the conditional transmittable state.

Step S1204 of FIG. 7 indicates an example in which, when the received field strength of the CTS is lower than the predetermined threshold value, the STA 100b sets the OBSS NAV and then sets the conditional transmittable state. Accordingly, if the predetermined condition is satisfied, the STA 100b can transmit data as in step S1208. Thereafter, in a case in which an ACK addressed to the AP 200b is received from the STA 100c belonging to the OBSS in step S1212, the STA 100b releases the OBSS NAV and the conditional transmittable state.

Figure 8:
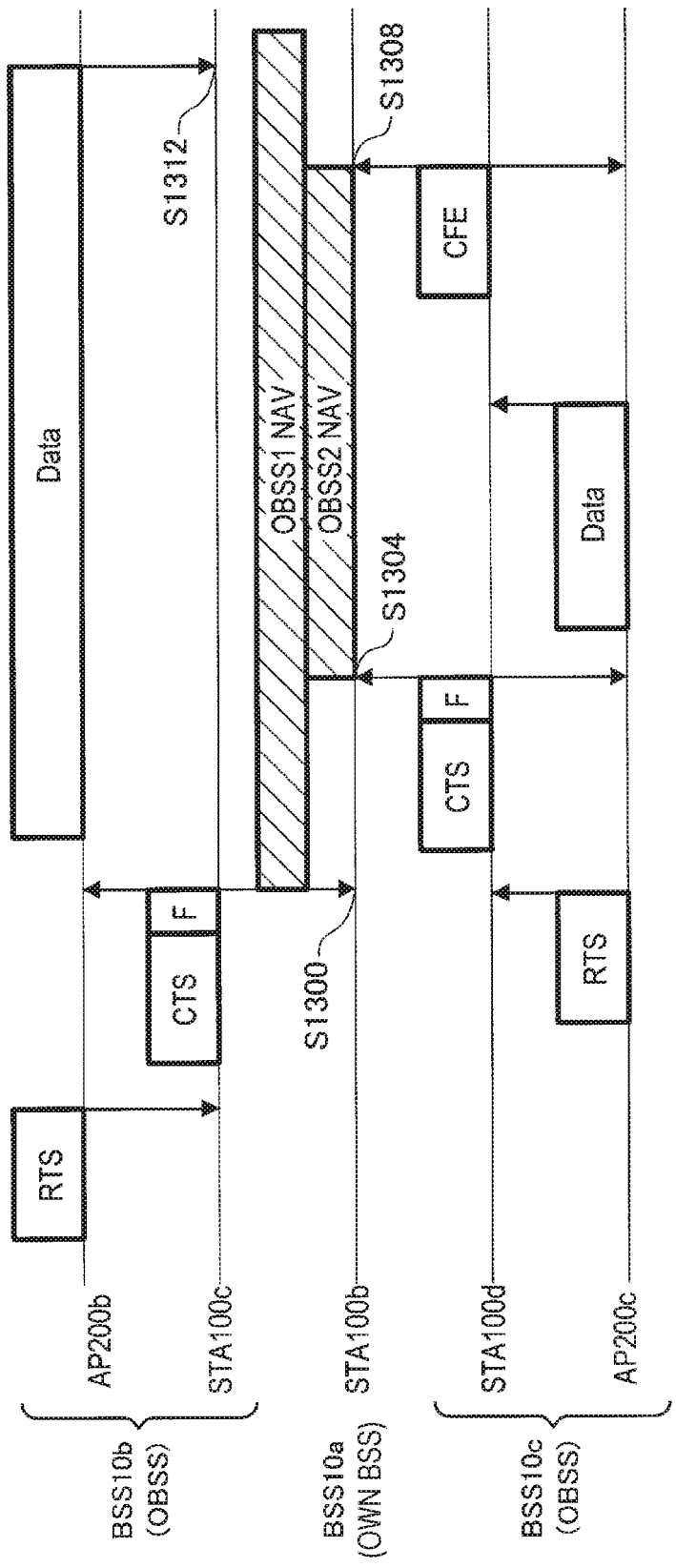
FIG. 8 is a diagram illustrating a setting of a NAV according to the present embodiment.

Next, the setting of the NAV according to the present embodiment will be described with reference to FIG. 8. In FIG. 8 corresponding to FIG. 4 described above, a BSS 10a, a BSS 10b, and a BSS 10c partially overlap each other, and an STA 100b belonging to the BSS 10a is located in the overlapping region. In other words, there are cases in which the STA 100b receives not only a signal transmitted from the BSS 10a which is the own BSS but also signals transmitted from the BSS 10b and the BSS 10c which are the OBSSs.

First, in step S1300 of FIG. 8, the STA 100b receives the CTS addressed to an AP 200b from an STA 100c belonging to the BSS 10b which is the OBSS. Here, since the footer including the BSS color is added to the CTS, the STA 100b can recognize that the CTS is a signal transmitted from the BSS 10b which is the OBSS on the basis of the BSS color. Then, the STA 100b sets the OBSS NAV for the BSS 10b (indicated by "OBSS1 NAV" in FIG. 8) on the basis of the Duration included in the CTS. In step S1304, the STA 100b receives the CTS addressed to the AP 200c from the STA 100d belonging to the BSS 10c which is the OBSS, and sets the OBSS NAV for the BSS 10c (indicated by "OBSS2 NAV" in FIG. 8) by a similar method.

Thereafter, in a case in Which the CF-END addressed to the AP 200c is received from the STA 100d belonging to the BSS 10c in step S1308, the OBSS2 NAV which is the NAV for the BSS 10c is released, and the OBSS1 NAV which is the NAV for the BSS 10b is not released. Accordingly, since the STA 100b does not perform the transmission process, interference does not occur even in a case in which the data frame is transmitted from the BSS 10b in step S1312.

2. Functional Configuration of Device

Figure 9:
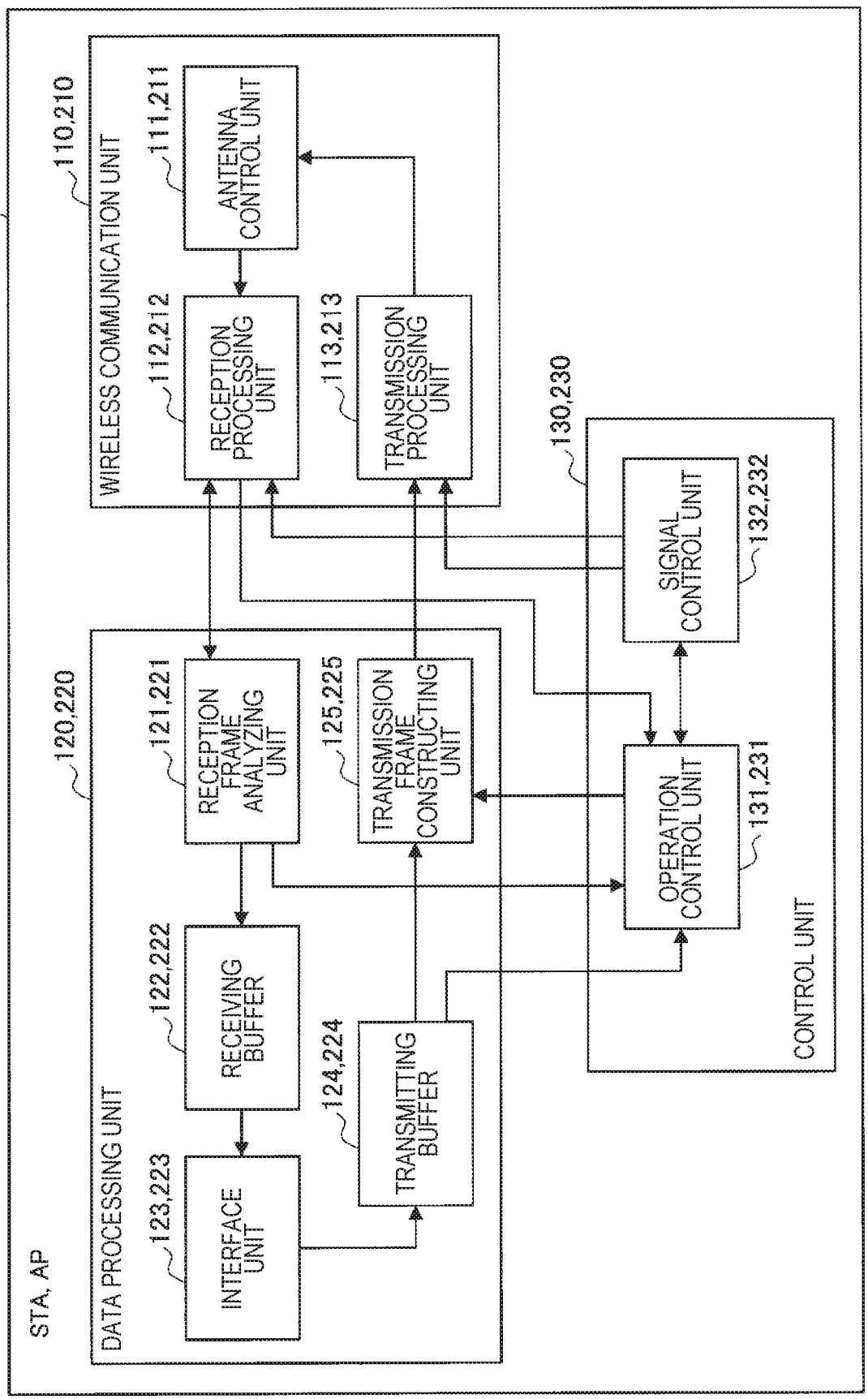
FIG. 9 is a diagram illustrating a functional configuration of each of an STA and an AP according to the present embodiment.

The overview of the functions of the wireless LAN system according to the present embodiment has been described above. Next, a functional configuration of each of the STA 100 and the AP 200 according to the present embodiment will be described with reference to FIG. 9. FIG. 9 is a diagram illustrating a functional configuration of each of the STA 100 and the AP 200 according to the present embodiment. Further, the function of adding the footer including the BSS color to the CTS described above, the function of determining the BSS from which a signal corresponding to the CTS is transmitted on the basis of the BSS color, the function of setting various types of NAVs on the basis of a determination result, and the like can be realized by any one of the STA 100 or the AP 200. In other words, since the STA 100 and the AP 200 can have the same functional configuration, the functional configuration of the STA 100 will be described below, and the description of the functional configuration of the AP 200 will be omitted.

As illustrated in FIG. 9, the present embodiment STA 100 includes a wireless communication unit 110, a data processing unit 120, and a control unit 130. Here, the wireless communication unit 110 functions as a transmitting unit and a receiving unit, the data processing unit 120 functions as a generating unit and an identifying unit, and the control unit 130 functions as a transmission suppression period setting unit.

The wireless communication unit 110 includes an antenna control unit 111, a reception processing unit 112, and a transmission processing unit 113. The data processing unit 120 includes a reception frame analyzing unit 121, a receiving buffer 122, an interface unit 123, a transmission buffer 124, and a transmission frame constructing unit 125. The control unit 130 includes an operation control unit 131 and a signal control unit 132.

(Antenna Control Unit 111)

The antenna control unit 111 controls transmission and reception of signals via at least one antenna. More specifically, the antenna control unit 111 provides the signal received via the antenna to the reception processing unit 112, and transmits the signal generated by the transmission processing unit 113 via the antenna.

(Reception Processing Unit 112)

The reception processing unit 112 performs frame reception processing on the basis of the signal provided from the antenna control unit 111. For example, the reception processing unit 112 outputs a baseband reception signal by performing analog processing and down-conversion on a signal obtained from an antenna. Then, the reception processing unit 112 calculates correlation between a predetermined signal pattern and the reception signal, while shifting the reception signal that is a target of computation on a time axis, and detects a preamble on the basis of appearance of a peak of correlation. Accordingly, the reception processing unit 112 can detect the RTS, the CTS, the data frame, the ACK, the CF-END, or the like. Further, the reception processing unit 112 acquires a frame by performing demodulation, decoding, and the like on a baseband reception signal and provides the acquired frame to the reception frame analyzing unit 121. Further, the reception processing unit 112 also decodes the footer in a case in which a notification indicating that the footer is added to the CTS is given from the reception frame analyzing unit 121 to be described later.

(Transmission Processing Unit 113)

The transmission processing unit 113 performs transmission processing of a transmission frame provided from a transmission frame constructing unit 125. More specifically, the transmission processing unit 113 generates a transmission signal on the basis of a frame provided from the transmission frame constructing unit 125 and parameter set by an instruction from a signal control unit 132. For example, the transmission processing unit 113 generates a baseband transmission signal by performing encoding, interleaving, and modulation on the frame provided from the transmission frame constructing unit 125 in accordance with coding and modulation schemes, and the like, instructed by the signal control unit 132. In addition, the transmission processing unit 113 performs up-conversion on the baseband transmission signal obtained by the preceding processing.

(Reception Frame Analyzing Unit 121)

The reception frame analyzing unit 121 analyzes the received frame and acquires various types of information. For example, the reception frame analyzing unit 121 analyzes the Reserved field of the received CTS, and determines the presence/absence of the footer on the basis of whether or not the footer notification information is set. Further, in a case in which it is determined that the footer is added to the CTS, the reception frame analyzing unit 121 gives a notification indicating the presence of the footer to the reception processing unit 112 and causes the reception processing unit 112 to decode the footer. After the footer is decoded, the reception frame analyzing unit 121 analyzes the footer and acquires the BSS color, the information related to the AID, and the like included in the footer. The reception frame analyzing unit 121 determines the BSS from which the signal corresponding to the CTS is transmitted on the basis of the acquired BSS color. The reception frame analyzing unit 121 provides various types of information (various types of information such as the result of determining the BSS from which the signal corresponding to the CTS is transmitted, the Duration included in the CTS, the received field strength of the CTS, and the like) obtained by the processing to the operation control unit 131 to be described later.

(Receiving Buffer 122)

The receiving buffer 122 stores data included in the received frame. The stored data is arbitrary. For example, the receiving buffer may store data included in the data frame or the BSS color, the information related to the AID, and the like included in the CTS.

(Interface Unit 123)

The interface unit 123 is an interface connected to another component included in the STA 100. More specifically, the interface unit 123 performs reception of data that is desired to be transmitted from the other component, for example, an application or a user interface, provision of reception data to the application or the user interface, or the like.

(Transmission Buffer 124)

The transmission buffer 124 stores transmission data provided from the interface unit 123.

(Transmission Frame Constructing Unit 125)

The transmission frame constructing unit 125 constructs a transmission frame. More specifically, the transmission frame constructing unit 125 constructs the CTS to which the footer including the BSS color, the information related to AID, and the like is added under the control of the operation control unit 131 to be described later. Further, in addition to the CTS, the transmission frame constructing unit 125 constructs various transmission frames such as the RTS, the data frame, the ACK, and the CF-END.

(Operation Control Unit 131)

The operation control unit 131 controls the NAV setting processing as a collision prevention procedure. More specifically, the operation control unit 131 acquires the information related to the CTS (various types of information such as the result of determining the BSS from which the signal corresponding to the CTS is transmitted, the Duration included in the CTS, the received field strength of the CTS, and the like) from the reception frame analyzing unit 121. Further, in a case in which the CTS is a signal transmitted from the own BSS, the operation control unit 131 sets the own BSS NAV on the basis of the Duration. In a case in which the CTS is a signal transmitted from the OBSS, the operation control unit 131 sets the OBSS NAV on the basis of the Duration. In a case in which the CTS is a signal transmitted from the OBSS, the operation control unit 131 further compares the received field strength of the CTS with a predetermined threshold value, and sets the conditional transmittable state during the OBSS NAV period in a case in which the received field strength of the CTS is lower than a predetermined threshold value. In a case in which the received field strength of the CTS is equal to or larger than the predetermined threshold value, the conditional transmittable state is not set. Further, the operation control unit 131 also controls the NAV setting processing by the RTS, the NAV release processing, the frame construction processing, the frame transmission processing, and the like in addition to the above operations.

(Signal Control Unit 132)

The signal control unit 132 controls processing of the wireless communication unit 110 as an access control processing procedure. More specifically, the signal control unit 132 controls transmission/reception processing of the wireless communication unit 110. For example, the signal control unit 132 causes the wireless communication unit 110 to set control information for transmission and reception on the basis of an instruction from the operation control unit 131. In addition, the signal control unit 132 controls vacant channel detection processing as in CSMA/CA. For example, the signal control unit 132 decides transmission start or transmission standby of a signal on the basis of a carrier sense result and back off time.

3. Operation of Device

The functional configuration of the device according to the present embodiment has been described above. Next, an operation of the device according to the present embodiment will be described.

3-1: CTS Transmission Operation and Subsequent Data Frame Reception Operation

Figure 10:
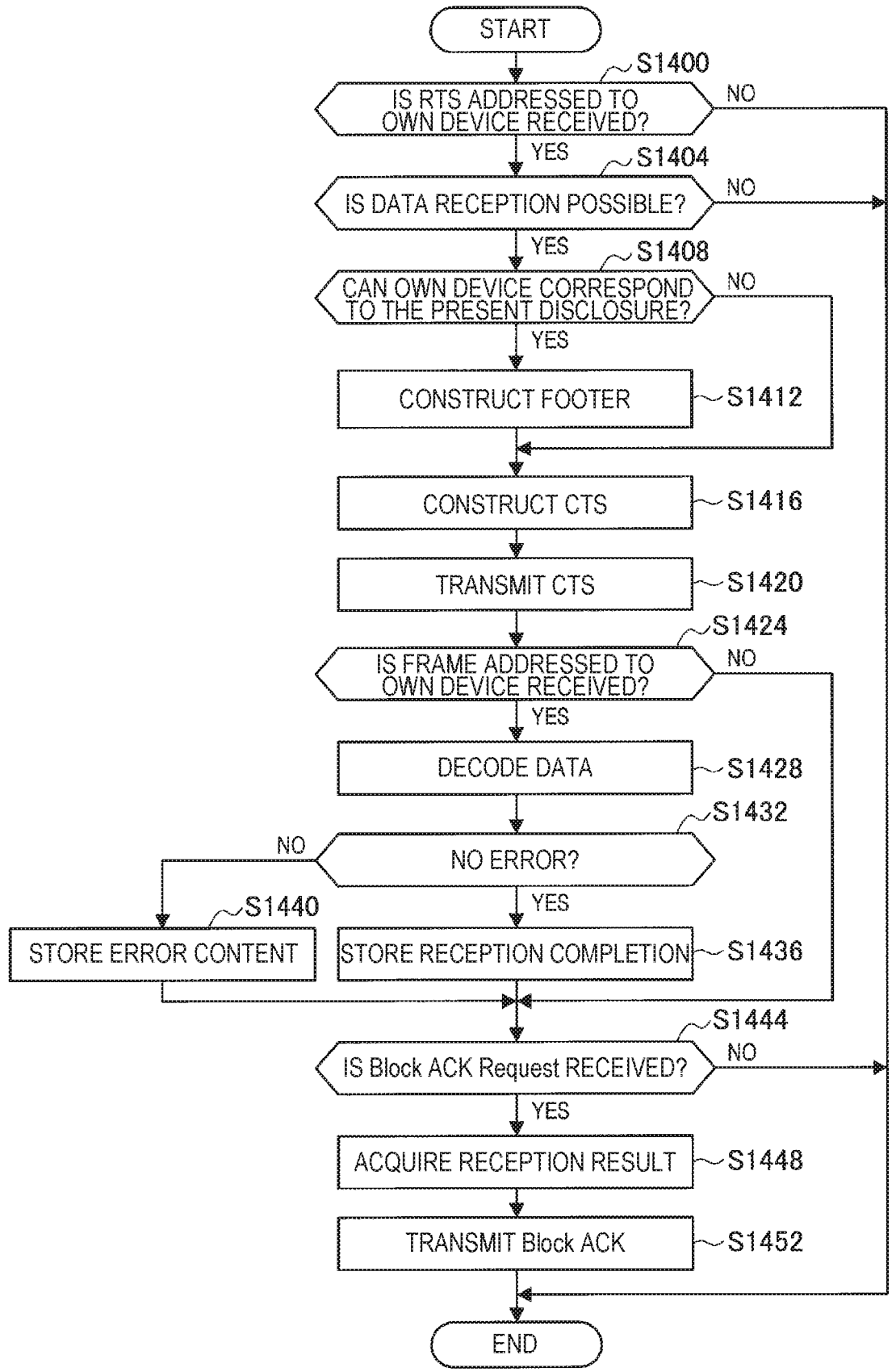
FIG. 10 is a flowchart illustrating a CTS transmission operation and a data frame reception operation by a communication device according to the present embodiment.

First, a CTS transmission operation and a subsequent data frame reception operation will be described with reference to FIG. 10, FIG. 10 is a flowchart illustrating a CTS transmission operation and a data frame reception operation by the communication device according to the present embodiment. Further, the following description will proceed with an example in which an operating entity is the AP 200, but the operating entity may be the STA 100.

First, in a case in which the wireless communication unit 210 of the AP 200 receives the RTS addressed to the own device in step S1400 (Yes in step S1400), in step S1404, the control unit 230 determines whether or not data can be received on the basis of the Duration or the like included in the RTS frame. In a case in which the control unit 230 determines that data can be received (Yes in step S1404), and the own device can correspond to the present disclosure (Yes in step S1408), in step S1412, the transmission frame constructing unit 225 constructs the footer. In step S1416, the transmission frame constructing unit 225 constructs the SIGNAL field, the service field, the PSDU field, and the like, and construct the CTS by adding the footer after the padding bit. In a case in which the own device is unable to correspond to the present disclosure in step S1408 (No in step S1408), the footer construction processing in step S1412 is omitted, and the transmission frame constructing unit 225 constructs a CTS including no footer. In step S1420, the wireless communication unit 210 transmits the CTS.

In a case in which the wireless communication unit 210 receives a data frame addressed to the own device after the SITS elapses since the wireless communication unit 210 transmits the CTS (Yes in step S1424), in step S1428, the wireless communication unit 210 performs processing such as data decoding. In a case in which the processing such as the data decoding is completed without error (Yes in step S1432), in step S1436, the data processing unit 220 stores information indicating that reception of data is completed. In a case in which an error occurs in the processing such as the data decoding (No in step S1432), in step S1440, the data processing unit 220 stores content of the error. Further, in a case in which the wireless communication unit 210 does not receive data addressed to the own device in step S1424 (No in step S1424), the process of steps S1428 to S1440 is skipped.

In a case in which the wireless communication unit 210 receives a Block ACK Request in step S1444 (Yes in step S1444), in step S1448, the control unit 230 acquires the reception result of the data frame. In step S1452, the transmission frame constructing unit 225 generates a Block ACK on the basis of the reception result of the data frame, and the wireless communication unit 210 transmits the Block ACK, and then ends the process. Further, the process ends in a case in which the wireless communication unit 210 does not receive the RTS addressed to the own device in step S1400 (No in step S1400), in a case in which the control unit 230 determines that data is unable to be received in step S1404 (No in Step S1404), or in a case in which the wireless communication unit 210 does not receive the Block ACK Request in step S1444 (No in step S1444).

3-2. Reception Operation of CTS Addressed to Another Device

Figure 11:
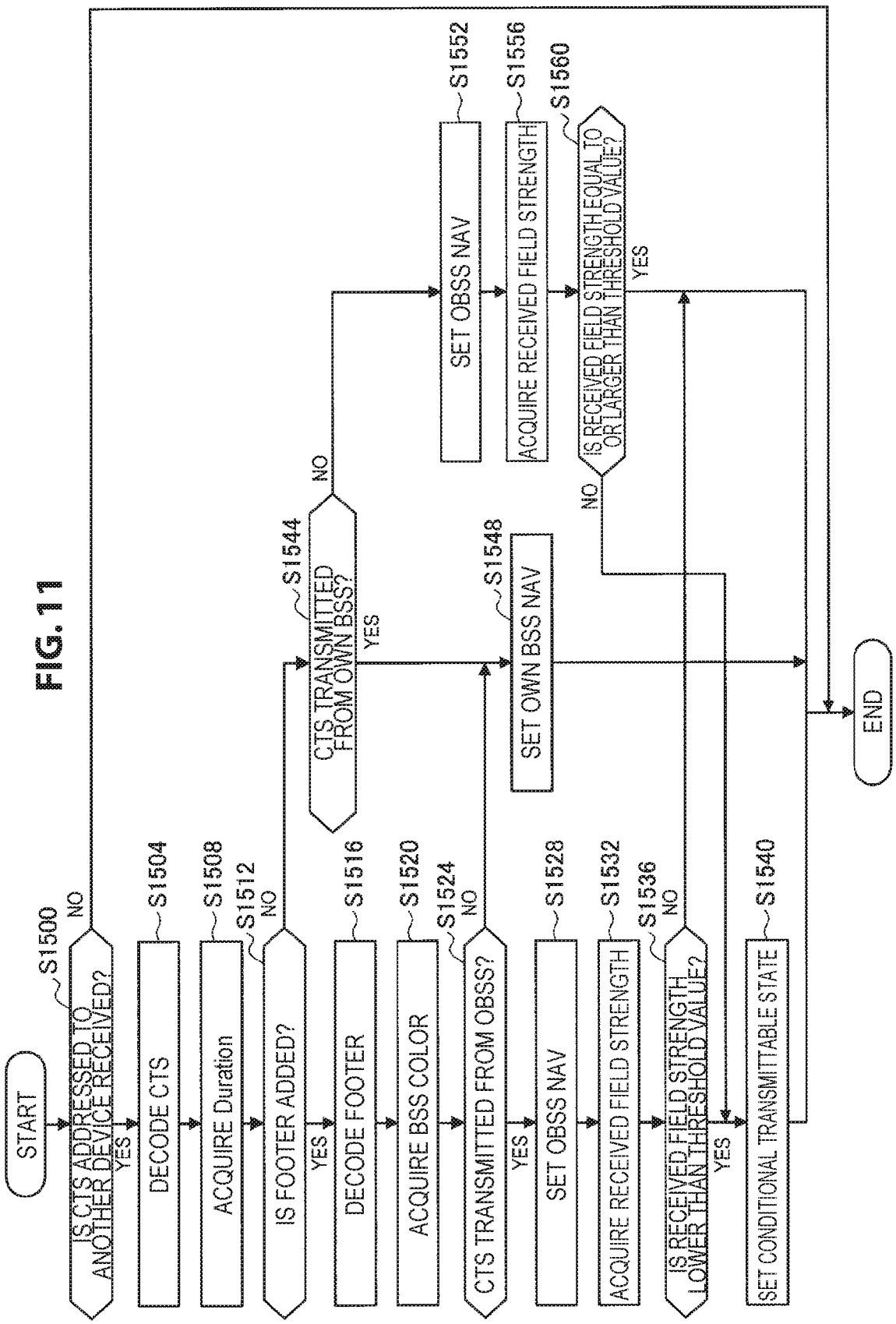
FIG. 11 is a flowchart illustrating an operation of receiving a CTS addressed to another device and setting a NAV by a communication device according to the present embodiment.

Next, the reception operation of the CTS addressed to another device will be described with reference to FIG. 11. FIG. 11 is a flowchart illustrating an operation of receiving the CTS addressed to another device and setting the NAY by the communication device according to the present embodiment. Further, the following description will proceed with an example in which the operating entity is the STA 100, but the operating entity may be the AP 200.

First, in a case in which the wireless communication unit 110 of the STA 100 receives the CTS addressed to another device in step S1500 (Yes in step S1500), in step S1504, the wireless communication unit 110 decodes the CTS. In step S1508, the reception frame analyzing unit 121 analyzes the decoded CTS and acquires the Duration. In step S1512, the reception frame analyzing unit 121 determines the presence or absence of footer on the basis of whether or not the footer notification information is set in the Reserved field. In a case in which the reception frame analyzing unit 121 determines that the footer is added (Yes in step S1512), in step S1516, the wireless communication unit 110 decodes the footer, and in step S1520, the reception frame analyzing unit 121 acquires the BSS color included in the footer.

In step S1524, the reception frame analyzing unit 121 determines the BSS from which a signal corresponding to the CTS is transmitted on the basis of the acquired BSS color. In a case in which it is determined that the CTS is a signal transmitted from the OBSS (Yes in step S1524), in step S1528, the operation control unit 131 sets the OBSS NAV on the basis of the Duration included in the CTS.

Thereafter, the operation control unit 131 acquires the received field strength of the CTS in step S1532, and compares the received field strength of the CI'S with a predetermined threshold value in step S1536. In a case in which the received field strength of the CTS is lower than the predetermined threshold value (Yes in step S1536), the operation control unit 131 sets the conditional transmittable state during the OBSS NAV in step S1540, and then ends the process. In a case in which the received field strength of the CTS is equal to or greater than the predetermined threshold value (No in step S1536), the operation control unit 131 ends the process without setting the conditional transmission enabled state.

In a case in which it is determined in step S1524 that the CTS is a signal transmitted from the own BSS (No in step S1524), in step S1548, the operation control unit 131 sets the own BSS NAV on the basis of the Duration included in the CTS, and then ends the process.

In a case in which it is determined in step S1512 that the footer is not added to the CTS (No in step S1512), and the CTS is determined to be a signal transmitted from the own BSS on the basis of the address information of the AP 200 of the own BSS set in the RA field of the CTS (Yes in step S1544), in step S1548, the operation control unit 131 sets the own BSS NAV on the basis of the Duration included in the CI'S and then ends the process.

In a case in which it is determined in step S1544 that the CTS is not a signal transmitted from the own BSS (No in step S1544), in step S1552, the operation control unit 131 sets the OBSS NAV on the basis of the Duration included in the CTS. Thereafter, the operation control unit 131 acquires the received field strength of the CTS in step S1556, and compares the received field strength of the CTS with a predetermined threshold value in step S1560. In a case in which the received field strength of the CTS is lower than the predetermined threshold value (No in step S1560), in step S1540, the operation control unit 131 sets the conditional transmittable state during the OBSS NAV and then ends the process. In a case in which the received field strength of the CTS is equal to or larger than the predetermined threshold value (Yes in step S1560), the process ends without the conditional transmittable state being set by the operation control unit 131. Further, in a case in which the wireless communication unit 110 does not receive the CTS addressed to another device in step S1500 (No in step S1500), the process ends.

3-3. Transmission Operation of Data Frame

Figure 12:
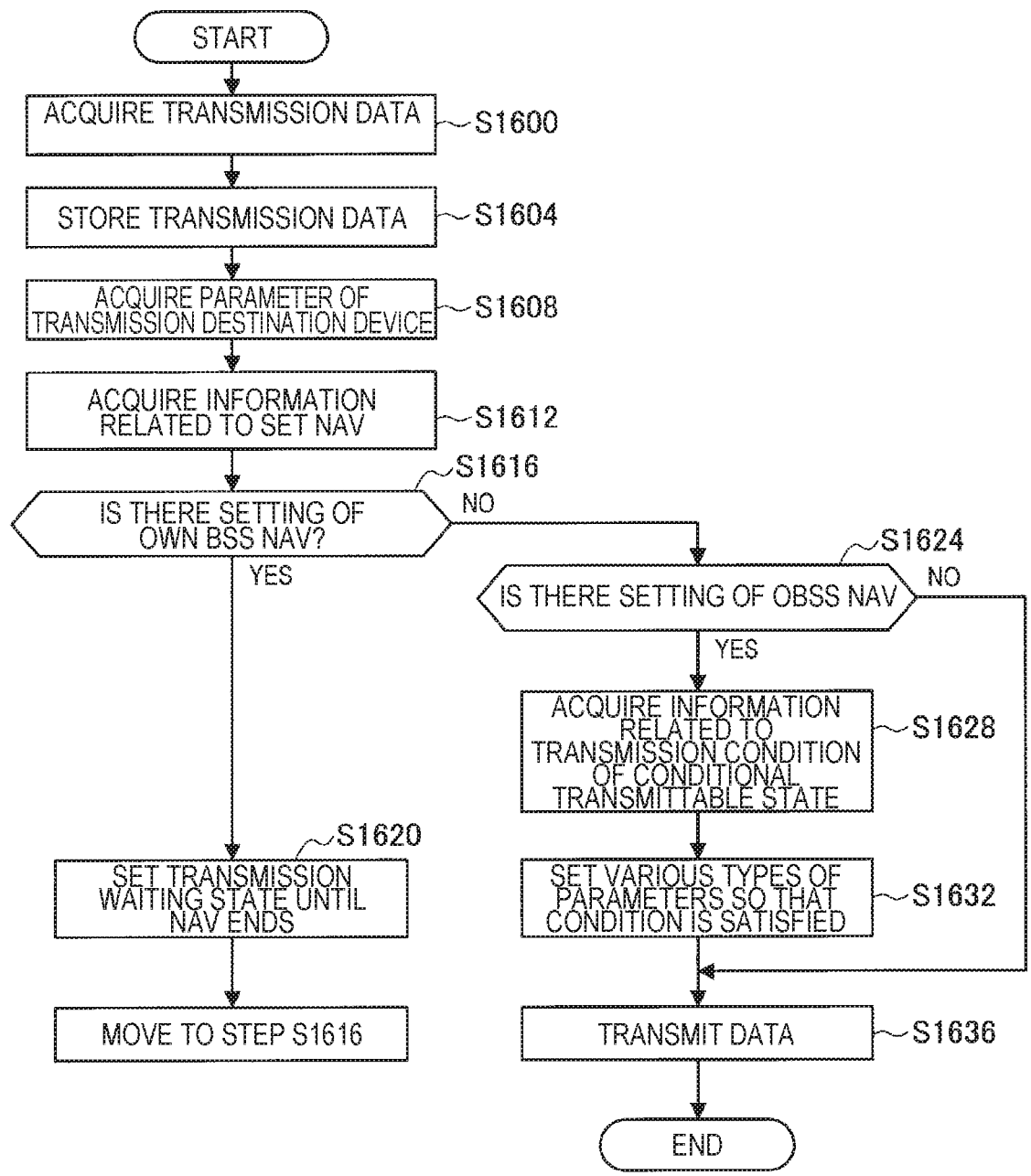
FIG. 12 is a flowchart illustrating a data frame transmission operation by a communication device according to the present embodiment.

Next, a data frame transmission operation will be described with reference to FIG. 12. FIG. 12 is a flowchart illustrating an operation of transmitting the data frame by the communication device according to the present embodiment. Further, the following description will proceed with an example in which the operating entity is the STA 100, but the operating entity may be the AP 200.

First, in step S1600, the data processing unit 120 acquires transmission data from a predetermined application, a user interface, or the like via the interface unit 123. In step S1604, the transmission buffer 124 stores the transmission data. In step S1608, the operation control unit 131 acquires parameters such as address information of a transmission destination device. In step S1612, the operation control unit 131 acquires information related to the NAV set in the own device. In a case in which the own BSS NAV is set (Yes in step S1616), in step S1620, the operation control unit 131 sets the transmission waiting state until the own BSS NAV ends.

Further, in a case in which the own BSS NAV is not set in step S1616 (No in step S1616), and the OBSS NAV is set (Yes in step S1624), in step S1628, the operation control unit 131 acquires information related to the transmission condition of the conditional transmittable state. In step S1632, the operation control unit 131 sets various types of parameters related to the transmission processing so that the acquired transmission condition is satisfied. For example, the operation control unit 131 sets the transmission power to a low value. Thereafter, in step S1636, the wireless communication unit 110 transmits data, and then the process ends. In a case in which the OBSS NAV is not set in step S1624 (No in step S1624), in step S1636, the wireless communication unit 110 transmits data, and then the process ends.

4. Modifications

The operation of the device according to the present embodiment has been described above. Next, modifications of the present disclosure will be described.

4-1. First Modification

Figure 13:
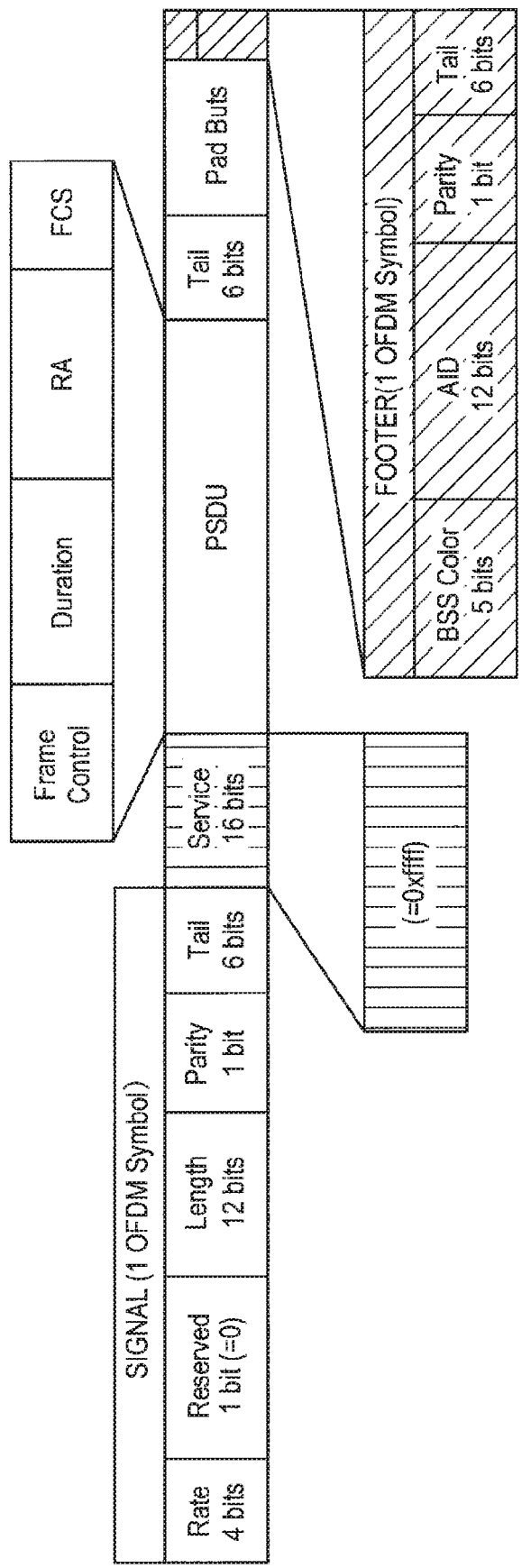
FIG. 13 is a diagram illustrating an example of a frame configuration of a CTS according to a first modification of the present disclosure.
Figure 14:
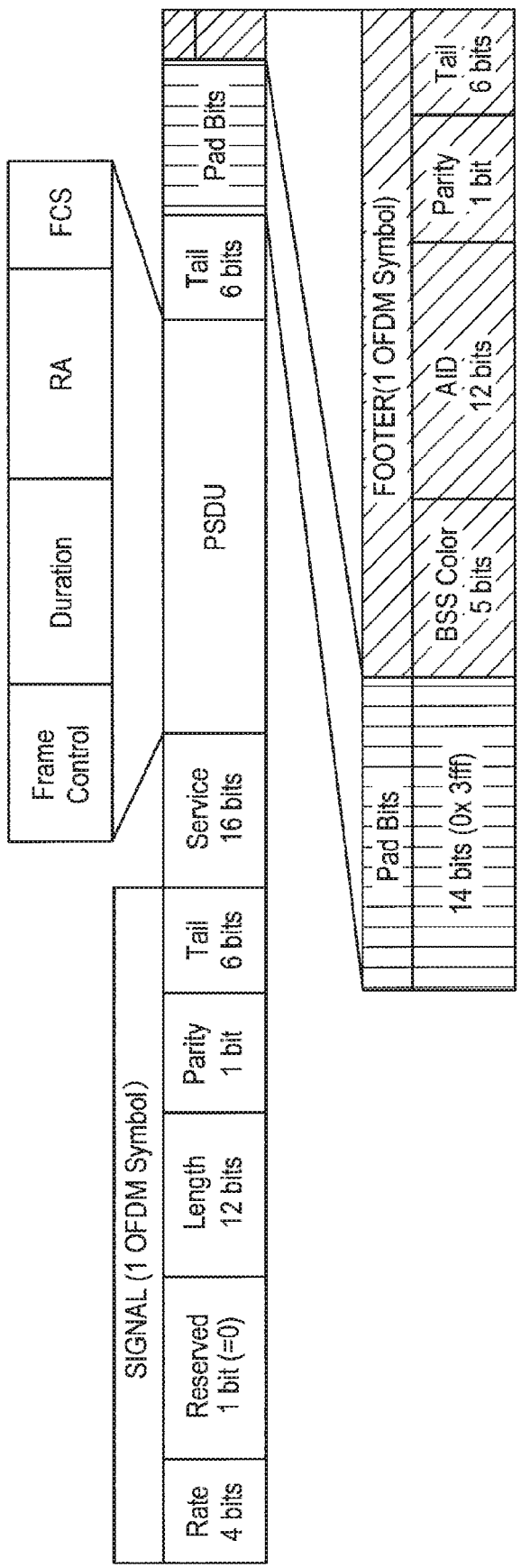
FIG. 14 is a diagram illustrating an example of a frame configuration of a CTS according to the first modification of the present disclosure.

First, a first modification of the present disclosure will be described with reference to FIGS. 13 and 14. FIGS. 13 and 14 are diagrams illustrating an example of a frame configuration of the CTS according to a first modification of the present disclosure.

In the above embodiment, the footer notification information is set in the Reserved field. However, this is merely an example, and a position at which the footer notification information is set is arbitrary. The first modification of the present disclosure is an embodiment in which the footer notification information is set at a position other than the Reserved field.

For example, as illustrated in FIG. 13, the footer notification information may be set in the Service field, in the example of FIG. 13, a bit string in which all bits are "I" is set in the Service field as the footer notification information.

Further, as illustrated in FIG. 14, the footer notification information may be set in the padding bit specified in IEEE 802.11. In the example of FIG. 14, a hit string in which all bits are "1" is set in the padding bit as the footer notification information.

Further, the case in which the bit string in which all bits are "1" is set in the Service field or the padding bit as the footer notification information is merely an example, and any information may be set.

As described above, since the position at which the footer notification information is set can be flexibly changed, the present disclosure can be applied to various wireless LAN systems.

Further, the footer notification information may be set in a state in which it is distributed to a plurality of fields. Accordingly, since more information can be notified of, information other than the information indicating that the footer is added can be notified of. For example, the information related to the position at which the BSS color is set, information related to the data length of the footer, or the like may be notified of.

4-2. Second Modification

Figure 15:
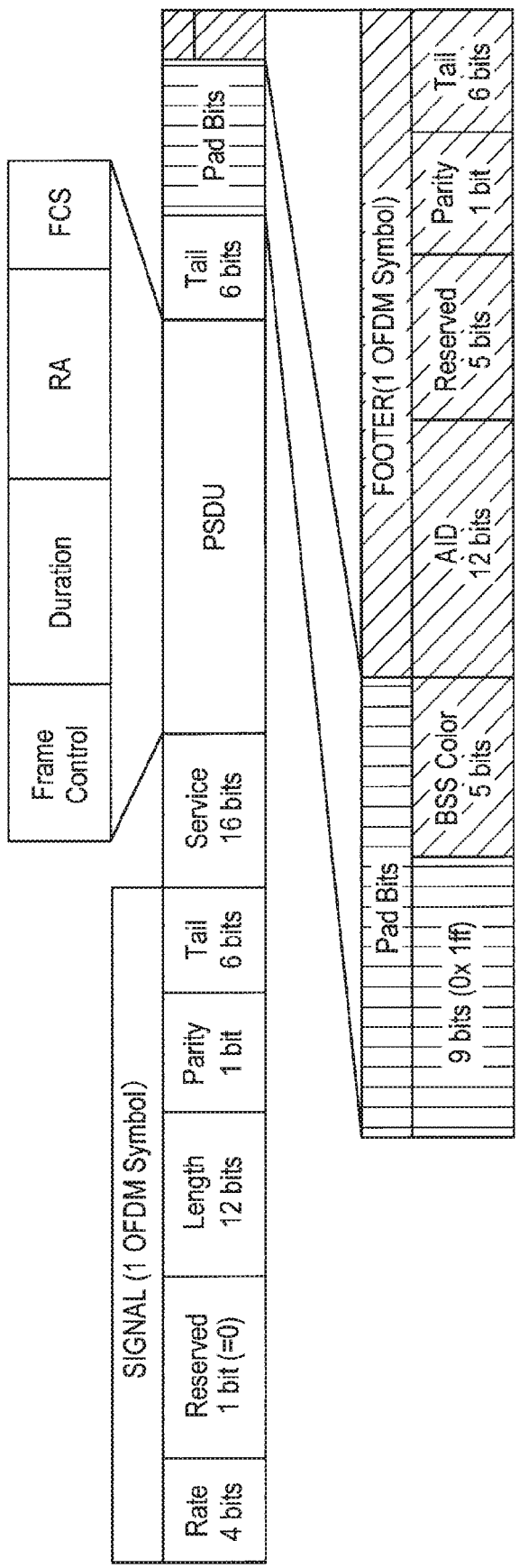
FIG. 15 is a diagram illustrating an example of a frame configuration of a CTS according to a second modification of the present disclosure.
Figure 16:
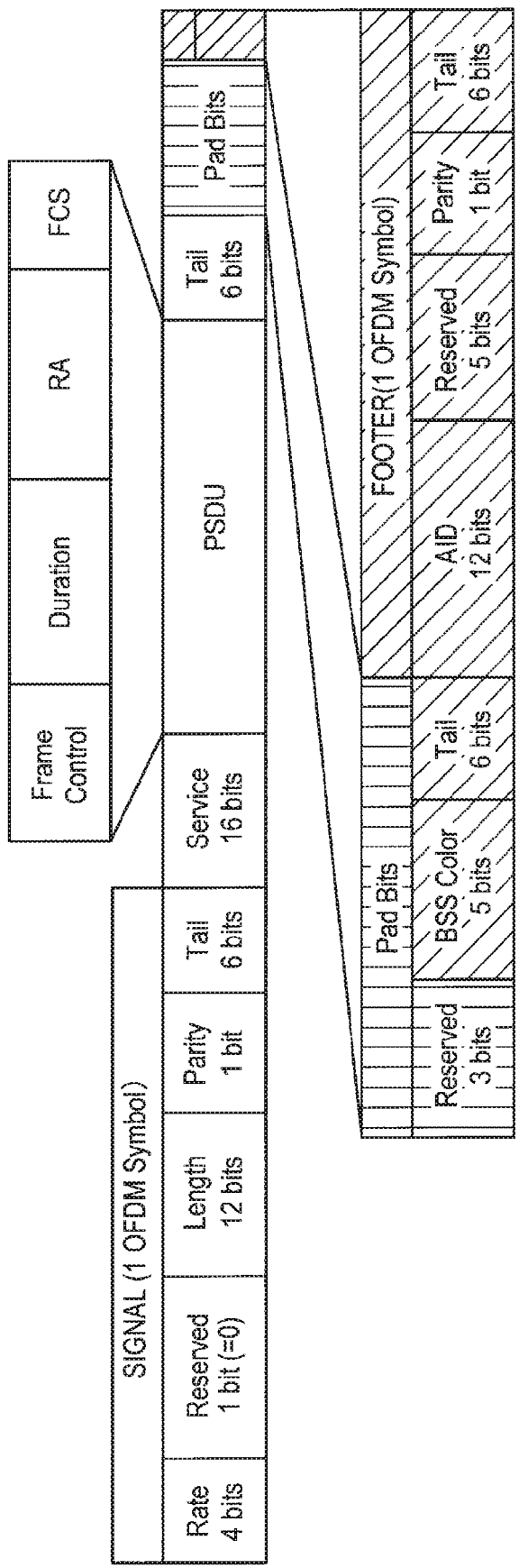
FIG. 16 is a diagram illustrating an example of a frame configuration of a CTS according to the second modification of the present disclosure.
Figure 17:
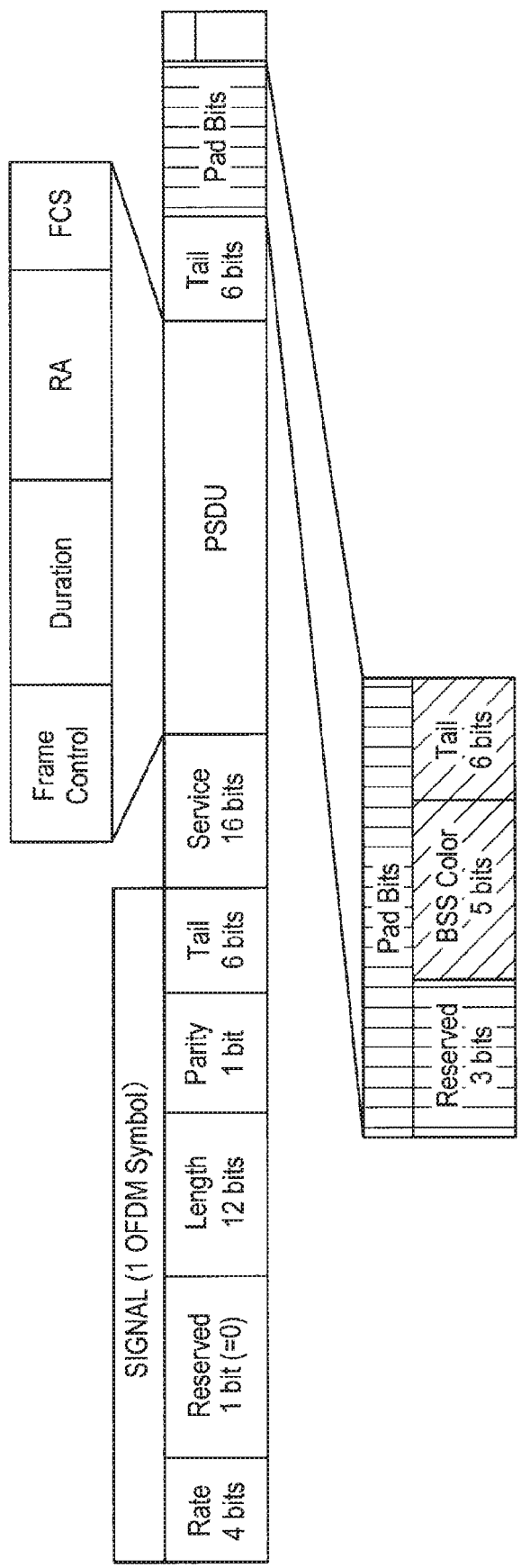
FIG. 17 is a diagram illustrating an example of a frame configuration of a CTS according to the second modification of the present disclosure.

The first modification of the present disclosure has been described above. Next, a second modification of the present disclosure will be described with reference to FIGS. 15 to 17. FIGS. 15 to 17 are diagrams illustrating an example of a frame configuration of the CTS according to a second modification of the present disclosure.

In the above embodiment, the BSS color is set in the footer. However, the position at which the BSS color is set is not limited to the footer. The second modification of the present disclosure is an embodiment in which the BSS color is set in the padding bit specified in IEEE 802.11 other than the footer. In the second modification, since there are cases in which the footer is not added as will be described below, the description will proceed using "BSS color notification information" as the information indicating that the BSS color is set rather than the "footer notification information." The communication device which has received the CTS according to the present embodiment can recognize that the BSS color is set in the padding bit on the basis of the BSS color notification information and determine the BSS from which a signal corresponding to the CTS is transmitted on the basis of the BSS color.

For example, as illustrated in FIG. 15, the BSS color may be set in the tail of the padding bit, and the AID, the Reserved field, the Parity bit, and the Tail bit may be set in the footer. Further, in FIG. 15, the BSS color notification information is set in the head of the padding bit, but similarly to the footer notification information, the position at which the BSS color notification information is set is arbitrary.

Further, as illustrated in FIG. 16, the tail bit may be set between the BSS color set in the padding bit and the AID set in the footer. Here, in the example illustrated in FIG. 15, since the tail bit is set in the tail of the footer, but the tail bit is not set between the BSS color and the AID, the communication device which has received the CTS is unable to acquire the BSS color in a case in which the decoding processing terminated in the tail bit in the tail of the footer fails. On the other hand, as illustrated in FIG. 16, even though the decoding processing terminated in the tail bit in the tail of the footer fails since the tail bit is set between the BSS color set in the padding bit and the AID set in the footer, in a case in which the decoding processing terminated in the tail bit between the BSS color and the AID is successful, the communication device which has received the CTS can acquire the BSS color.

Further, as illustrated in FIG. 17, the BSS color and tail bit are set in the padding bit, and the footer may not be added. Accordingly, the communication device can omit the processing of generating the footer.

Further, in the second modification of the present disclosure, the backward compatibility can be ensured. More specifically, in a case in which the legacy device receives the CTS according to the present embodiment, since it is not recognized that the BSS color is set in the padding bit, the decoding processing terminated in the Tail bit set just before the padding bit is performed, and thus the reception processing can be performed without error.

5. Application Examples

The technology according to the present disclosure can be applied to various products. For example, the STA 100 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the STA 100 may be realized as terminals that perform machine to machine (M2M) communication (also referred to as machine type communication (MTC) terminals) such as smart meters, vending machines, remotely controlled monitoring devices, or point of sale (POS) terminals. Furthermore, the STA 100 may be wireless communication modules mounted in such terminals (for example, integrated circuit modules including one die).

On the other hand, for example, the AP 200 may be realized as a wireless LAN access point (also referred to as a wireless base station) which has a router function or does not have a router function. Further, the AP 200 may be realized as a mobile wireless LAN router. Further, the AP 200 may also be a wireless communication module (for example, an integrated circuit module configured with one die) mounted on such devices.

5-1. First Application Example

Figure 18:
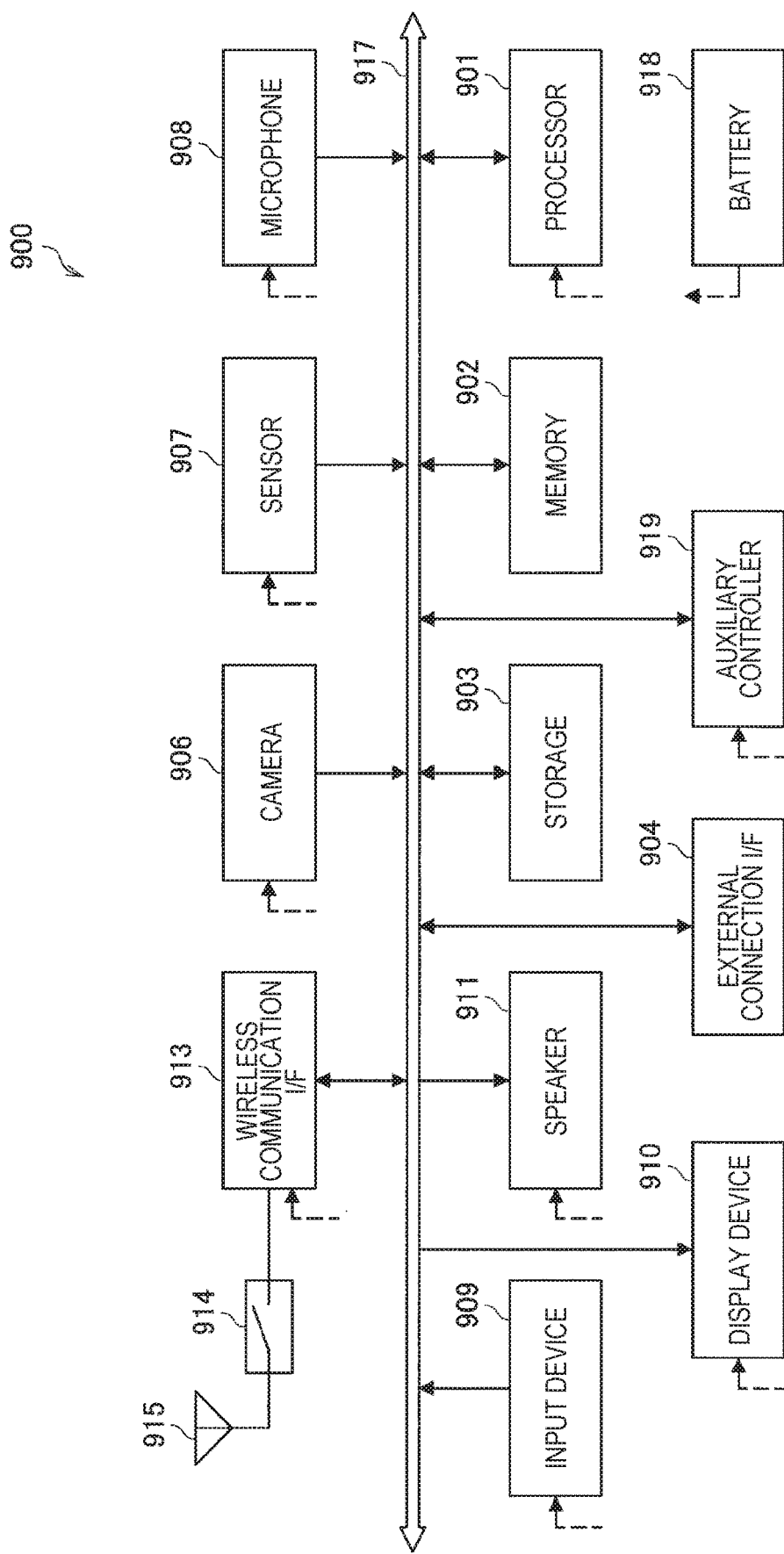
FIG. 18 is a block diagram illustrating an example of a schematic configuration of a smartphone.

FIG. 18 is a block diagram illustrating an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The external connection interface 904 is an interface for connecting an externally attachable device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, 11ad, and 11ax and the like, to establish wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Note that. Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals through the wireless communication interface 913.

Note that the smartphone 900 may include a plurality of antennas (for example, antennas for a wireless LAN or antennas for a proximity wireless communication scheme, or the like), without being limited to the example of FIG. 18. In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 18 via power supply lines partially indicated by dashed lines in the drawing. The auxiliary controller 919 causes, for example, necessary minimum functions of the smartphone 900 to be operated in a sleep mode.

Note that the smartphone 900 may operate as a wireless access point (software AP) as the processor 901 executes the function of an access point at an application level. In addition, the wireless communication interface 913 may have the function of a wireless access point.

5-2. Second Application Example

Figure 19:
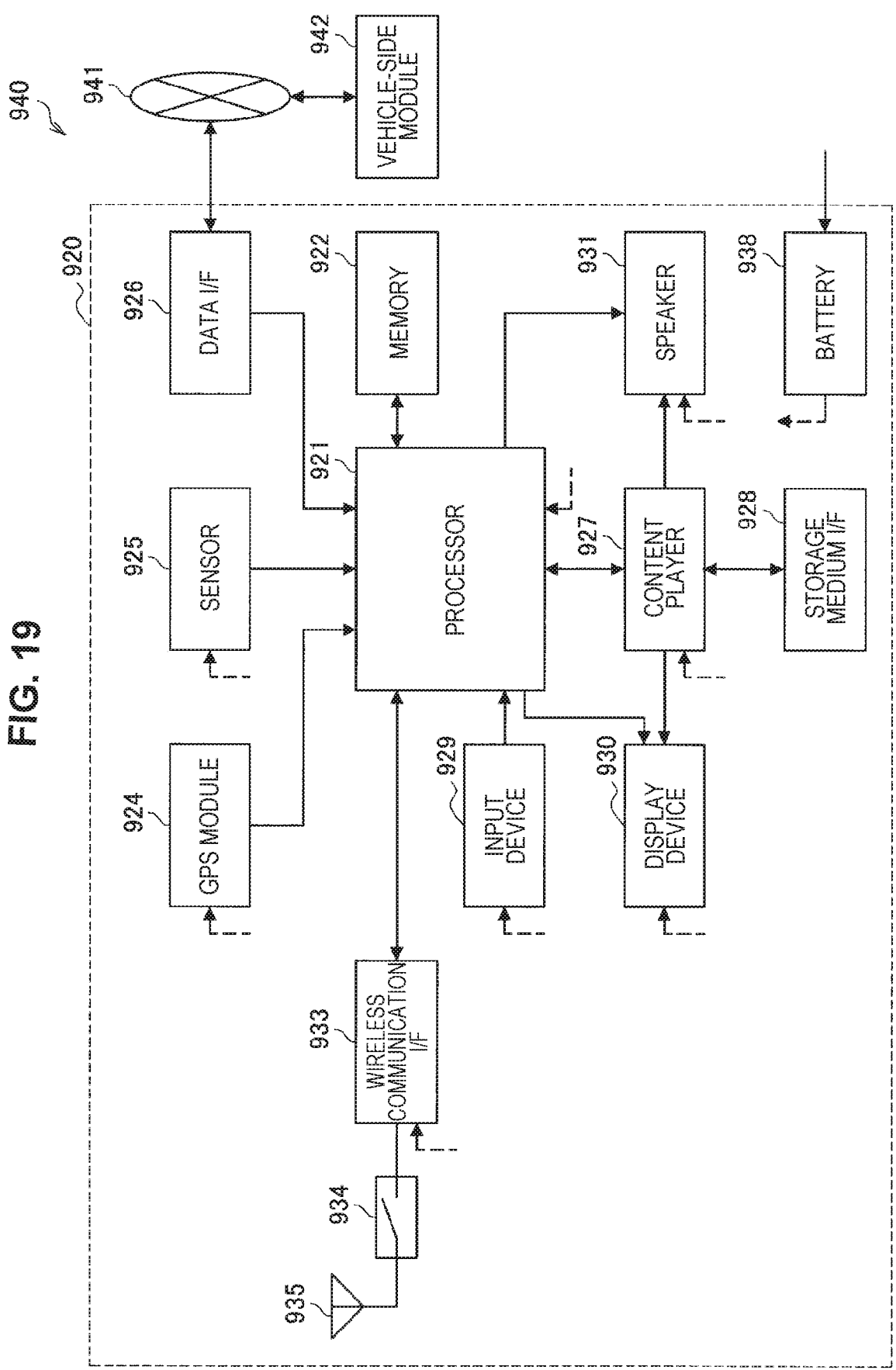
FIG. 19 is a block diagram illustrating an example of a schematic configuration of a car navigation device.

FIG. 19 is a block diagram illustrating an example of a schematic configuration of a car navigation device 920 to which the technology of the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, 11ad, and 11ax and the like to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 19, In this case, the antenna switch 934 may be omitted from the configuration of the car navigation device 920.

The battery 938 supplies electric power to each of the blocks of the car navigation device 920 illustrated in FIG. 19 via power supply lines partially indicated by dashed lines in the drawing. In addition, the battery 938 accumulates electric power supplied from the vehicle side.

In addition, the wireless communication interface 933 may operate as the AP 200 described above, and provide wireless communication for a terminal of a user on the vehicle.

Further, the technology of the present disclosure may be realized as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

5-3. Third Application Example

Figure 20:
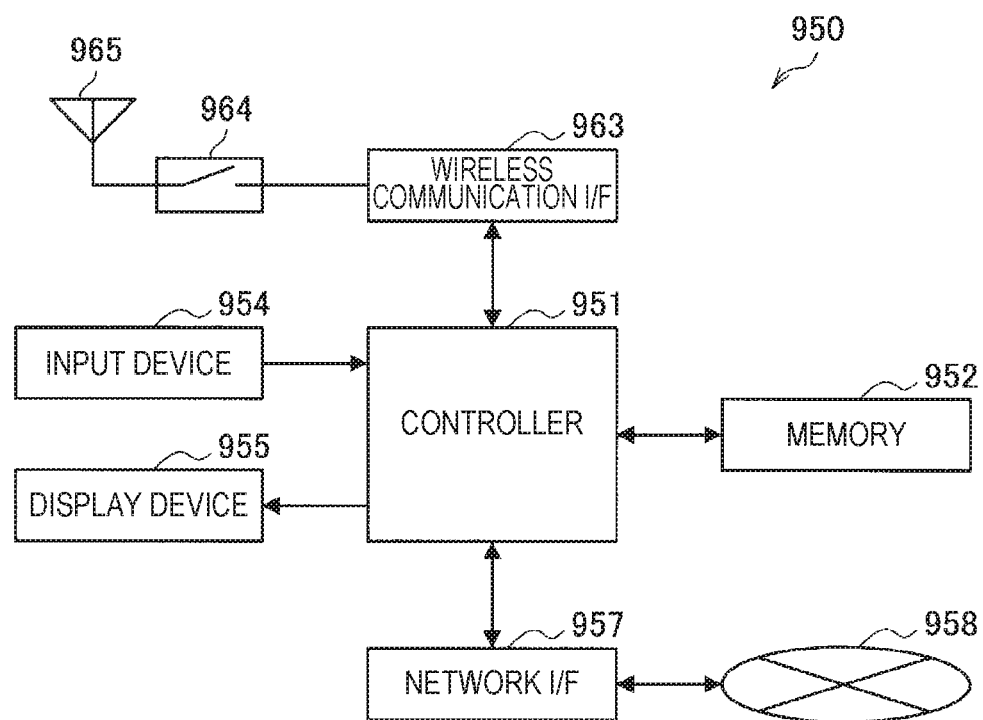
FIG. 20 is a block diagram illustrating an example of a schematic configuration of a wireless access point.

FIG. 20 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button, a switch, or the like, and receives operation performed by a user. The display device 955 includes an LED or the like and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, 11ad, 11ax, and the like to supply wireless connection to a nearby terminal as an access point. The wireless communication interface 963 can typically include a baseband processor, an RF circuit, a power amplifier, and the like. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

6. Others

The above description has proceeded mainly with the example in which the present disclosure is applied to the CTS which is a sort of response frame. Here, the present disclosure can be applied to the ACK which is a sort of response frame in addition to the CTS.

More specifically, each communication device can construct the ACK to which the footer including the BSS color is added as in the above embodiment and set the BSS color in the padding bit specified in IEEE 802.11. Further, the information indicating that the footer is added or the information indicating that the BSS color is set in the padding bit is set in the frame together, similarly to the above embodiment, and thus description thereof is omitted.

The embodiment in which the present disclosure is applied to the ACK is particularly effective in a case in which the NAV is set by the ACK. For example, in a case in which the STA 100 cannot receive the RTS and the CTS due to a certain reason and receives the ACK transmitted thereafter, the STA 100 can determine the BSS from which a signal corresponding to the ACK is transmitted on the basis of the BSS color included in the footer of the ACK. Then, in a case in which it is determined that the ACK is a signal transmitted from the own BSS, the STA 100 sets the own BSS NAV on the basis of the Duration included in the ACK, and in a case in which it is determined that the ACK is a signal transmitted from the OBSS, the STA 100 sets the OBSS NAV on the basis of the Duration included in the ACK. Further, in this embodiment, a value other than 0 is set as the Duration included in the ACK. Accordingly, the STA 100 can reduce the possibility of the occurrence of interference even in an unstable communication environment in which the RI'S and the CTS are unable to be received, but the ACK can be received.

Further, the embodiment in which the present disclosure is applied to the ACK is effective not only in a case in which preparation for data transmission/reception is performed by the RTS and the CTS but also in a case in which preparation for data transmission/reception is performed by small capacity data and the ACK. For example, in a case in which the STA 100 transmits data, the STA 100 transmits not the RTS but small capacity data to the AP 200 before the data is transmitted. The AP 200 which has received the small-capacity data transmits the ACK to the STA 100, and the STA 100 which has received the ACK determines that data transmission is permitted, and transmits data to the AP 200.

At this time, in a case in which the STA 100 other than the STA 100 that transmits the data receives the ACK, the STA 100 can determine the BSS from which a signal corresponding to the ACK is transmitted on the basis of the BSS color included in the footer of the ACK. Then, in a case in which it is determined that the ACK is a signal transmitted from the own BSS, the STA 100 sets the own BSS NAV on the basis of the Duration included in the ACK, and in a case in which it is determined that the ACK is a signal transmitted from the OBSS, the STA 100 sets the OBSS NAV on the basis of the Duration included in the ACK. Further, also in this case, a value other than 0 is set as the Duration included in the ACK. Accordingly, it is possible to reduce the possibility of the occurrence of interference even in a case in which preparation for data transmission/reception is performed with the small capacity data and the ACK.

7. Conclusion

As described above, the response frame in accordance with the present disclosure includes the BSS color in the footer or the padding bit. Accordingly, the communication device which has received the response frame can determine the BSS from which a signal corresponding to the response frame is transmitted on the basis of the BSS color and appropriately select the own BSS NAV or the OBSS NAV in accordance with the determination result. Further, the communication device according to the present embodiment can set a different OBSS NAV for each OBSS. Accordingly, the communication device according to the present embodiment can appropriately set and release the OBSS NAV. Further, the present disclosure can ensure the backward compatibility. In other words, the communication device according to the present embodiment can appropriately communicate with the legacy device to which the present disclosure is not applied.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, respective steps illustrated in FIGS. 10 to 12 need not necessarily be processed in a chronological order in accordance with a sequence described as the flowchart. In other words, respective steps may be processed in an order different from the order described as the flowchart or may be processed in parallel.

Further, some of the components of the STA 100 can be installed outside the STA 100 as appropriate. Similarly, some of the components of the AP 200 may be installed outside the AP 200 as appropriate. In addition, some functions of the STA 100 may be implemented by the control unit 130. For example, the control unit 130 may implement some functions of the wireless communication unit 110 or the data processing unit 120. Similarly, some functions of the AP 200 may be implemented by the control unit 230. For example, the control unit 230 may implement some functions of the wireless communication unit 210 or the data processing unit 220.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication device that transmits a response frame, including:
- a generating unit configured to generate the response frame in which information used for identification of a BSS to which the communication device belongs or information used for identification of an oval device is included in or after a padding bit specified in IEEE 802.11; and
- a transmitting unit configured to transmit the response frame.

(2)

The communication device according to (1), in which the generating unit adds a footer including the information used for the identification of the BSS after the padding bit.

(3)

The communication device according to (2), in which the footer is added after a bit specified by frame length information included in the response frame.

(4)

The communication device according to any one of (1) to (3), in which the generating unit sets information notifying that the information used for the identification of the BSS is included in the response frame in or before the padding bit.

(5)

The communication device according to (4), in which the generating unit sets information notifying that the information used for the identification of the BSS is included in the response frame in at least one of a reserved field, a service field, or the padding bit specified in IEEE 802.11.

(6)

The communication device according to (1) (5), in which the generating unit includes a tail bit after a bit string which is the information used for the identification of the BSS.

(7)

The communication device according to any one of (1) to (6), in which the information used for the identification of the BSS includes a BSS color, the response frame includes a CTS or an ACK, and the communication device includes an access point device or a station device.

(8)

The communication device according to any one of (1) to (6), in which the information used for the identification of the own device includes information related to an AID, the response frame includes a CTS or an ACK, and the communication device includes an access point device or a station device.

(9)

The communication device according to any one of (1) to (8), in which the generating unit includes a tail bit after a bit string which is the information used for the identification of the own device.

(10)

A communication control method of transmitting a response frame executed by a computer, including:
- generating the response frame in which information used for identification of a BSS to which an own device belongs or information used for identification of the own device is included in or after a padding bit specified in IEEE 802.11; and
- transmitting the response frame.

(11)

A communication device that receives a response frame, including:
- a receiving unit configured to receive the response frame in which information used for identification of a BSS to which a transmitting device of the response frame belongs or information used for identification of the transmitting device is included in or after a padding hit specified in IEEE 802.11; and
- an identifying unit configured to identify the BSS on the basis of the information used for the identification of the BSS.

(12)

The communication device according to (11), further including, a transmission suppression period setting unit configured to set a first transmission suppression period in a case in which the BSS is identified as an own BSS, and set a second transmission suppression period in a case in which the BSS is identified as an OBSS that overlaps the own BSS.

(13)

The communication device according to (12), in which the transmission suppression period setting unit sets the second transmission suppression period for each OBSS.

(14)

The communication device according to any one of (11) to (13), in which the identifying unit identifies the BSS on the basis of the information used for the identification of the BSS in a case in which information notifying that the information used for the identification of the BSS is included in the response frame is included in or before the padding bit.

(15)

A communication control method of receiving a response frame executed by a computer, including:
- receiving the response frame in which information used for identification of a BSS to which a transmitting device of the response frame belongs or information used for identification of the transmitting device is included in or after a padding bit specified in IEEE 802.11; and
- identifying the BSS on the basis of the information used for the identification of the BSS.

REFERENCE SIGNS LIST

100 STA
200 AP
110, 210 wireless communication unit
111, 211 antenna control unit
112, 212 reception processing unit
113, 213 transmission processing unit
120, 220 data processing unit
121, 221 reception frame analyzing unit
122, 222 receiving buffer 123, 223 interface unit
124, 224 transmission buffer
125, 225 transmission frame constructing unit
130, 230 control unit
131, 231 operation control unit
132, 232 signal control unit

The invention claimed is:

1. A communication device that transmits a response frame, comprising circuitry configured to:
generate the response frame in which information used for identification of a BSS to which the communication device belongs or information used for identification of an own device is included in or after a padding bit specified in IEEE 802.11;
add a footer including the information used for the identification of the BSS after the padding bit; and
transmit the response frame.

2. The communication device according to claim 1, wherein the footer is added after a bit specified by frame length information included in the response frame.

3. The communication device according to claim 1, wherein the circuitry is further configured to set information notifying that the information used for the identification of the BSS is included in the response frame in or before the padding bit.

4. The communication device according to claim 3, wherein the circuitry is further configured to set information notifying that the information used for the identification of the BSS is included in the response frame in at least one of a reserved field, a service field, or the padding bit specified in IEEE 802.11.

5. The communication device according to claim 1, wherein the circuitry is further configured to include a tail bit after a bit string which is the information used for the identification of the BSS.

6. The communication device according to claim 1, wherein the information used for the identification of the BSS includes a BSS color,
the response frame includes a CTS or an ACK, and
the communication device includes an access point device or a station device.

7. The communication device according to claim 1, wherein the information used for the identification of the own device includes information related to an AID,
the response frame includes a CTS or an ACK, and
the communication device includes an access point device or a station device.

8. The communication device according to claim 1, wherein the circuitry is further configured to include a tail bit after a bit string which is the information used for the identification of the own device.

9. A communication control method of transmitting a response frame executed by a computer, comprising:
generating the response frame in which information used for identification of a BSS to which an own device belongs or information used for identification of the own device is included in or after a padding bit specified in IEEE 802.11;
add a footer including the information used for the identification of the BSS after the padding bit; and
transmitting the response frame.

10. A communication device that receives a response frame, comprising circuitry configured to:
receive the response frame in which information used for identification of a BSS to which a transmitting device of the response frame belongs or information used for identification of the transmitting device is included in or after a padding bit specified in IEEE 802.11;
identify the BSS on a basis of the information used for the identification of the BSS and a list of identifiers of the own BSS and one or more OBSS that overlaps the own BSS; and
set a first transmission suppression period in a case in which the BSS is identified as an own BSS, and set a second transmission suppression period in a case in which the BSS is identified as an OBSS that overlaps the own BSS.

11. The communication device according to claim 10, wherein the circuitry is further configured to set the second transmission suppression period for each OBSS.

12. The communication device according to claim 10, wherein the circuitry is further configured to identify the BSS on a basis of the information used for the identification of the BSS in a case in which information notifying that the information used for the identification of the BSS is included in the response frame is included in or before the padding bit.

13. A communication control method of receiving a response frame executed by a computer, comprising:
receiving the response frame in which information used for identification of a BSS to which a transmitting device of the response frame belongs or information used for identification of the transmitting device is included in or after a padding bit specified in IEEE 802.11;
identifying the BSS on a basis of the information used for the identification of the BSS and a list of identifiers of the own BSS and one or more OBSS that overlaps the own BSS; and
setting a first transmission suppression period in a case in which the BSS is identified as an own BSS, and set a second transmission suppression period in a case in which the BSS is identified as an OBSS that overlaps the own BSS.

* * * * *